United States Patent [19]

Sato

[11] Patent Number: 5,162,721
[45] Date of Patent: Nov. 10, 1992

[54] ELECTRONIC SYSTEM TO DISCRIMINATE A PLURALITY OF POWER SOURCES

[75] Inventor: Shoji Sato, Yokohama, Japan

[73] Assignee: Canon Kabushiki Kaisha, Tokyo, Japan

[21] Appl. No.: 536,299

[22] Filed: Jun. 7, 1990

[30] Foreign Application Priority Data

Jun. 8, 1989 [JP] Japan ................... 1-144016

[51] Int. Cl.$^5$ ............................................... H02J 7/00
[52] U.S. Cl. ............................................ 320/15; 320/2; 324/115
[58] Field of Search ................. 320/2, 13, 15, 19, 21, 320/22, 48; 324/115

[56] References Cited

U.S. PATENT DOCUMENTS

| | | | |
|---|---|---|---|
| 3,464,012 | 8/1969 | Webb | 324/115 |
| 4,396,881 | 8/1983 | Cook et al. | 320/48 |
| 4,467,264 | 8/1984 | Blake et al. | 320/2 |
| 4,577,144 | 3/1986 | Hodgman et al. | 320/2 |
| 4,577,145 | 3/1986 | Mullersman | 320/2 |
| 4,628,242 | 12/1986 | Scholefield | 320/2 |
| 4,628,243 | 12/1986 | Hodgman et al. | 320/2 |
| 4,755,733 | 7/1988 | Laliberte | 320/15 |
| 4,849,682 | 7/1989 | Bauer et al. | 320/15 |

*Primary Examiner*—Steven L. Stephan
*Assistant Examiner*—Kristine L. Peckman
*Attorney, Agent, or Firm*—Fitzpatrick, Cella, Harper & Scinto

[57] ABSTRACT

A multipower type electronic system discriminates the kind of power source connected to it. A detection voltage and/or a detection voltage timing interval is set on the basis of the discriminated type of power source and a predetermined display is executed on the basis of the power source type discrimination and/or the detection voltage setting.

16 Claims, 17 Drawing Sheets

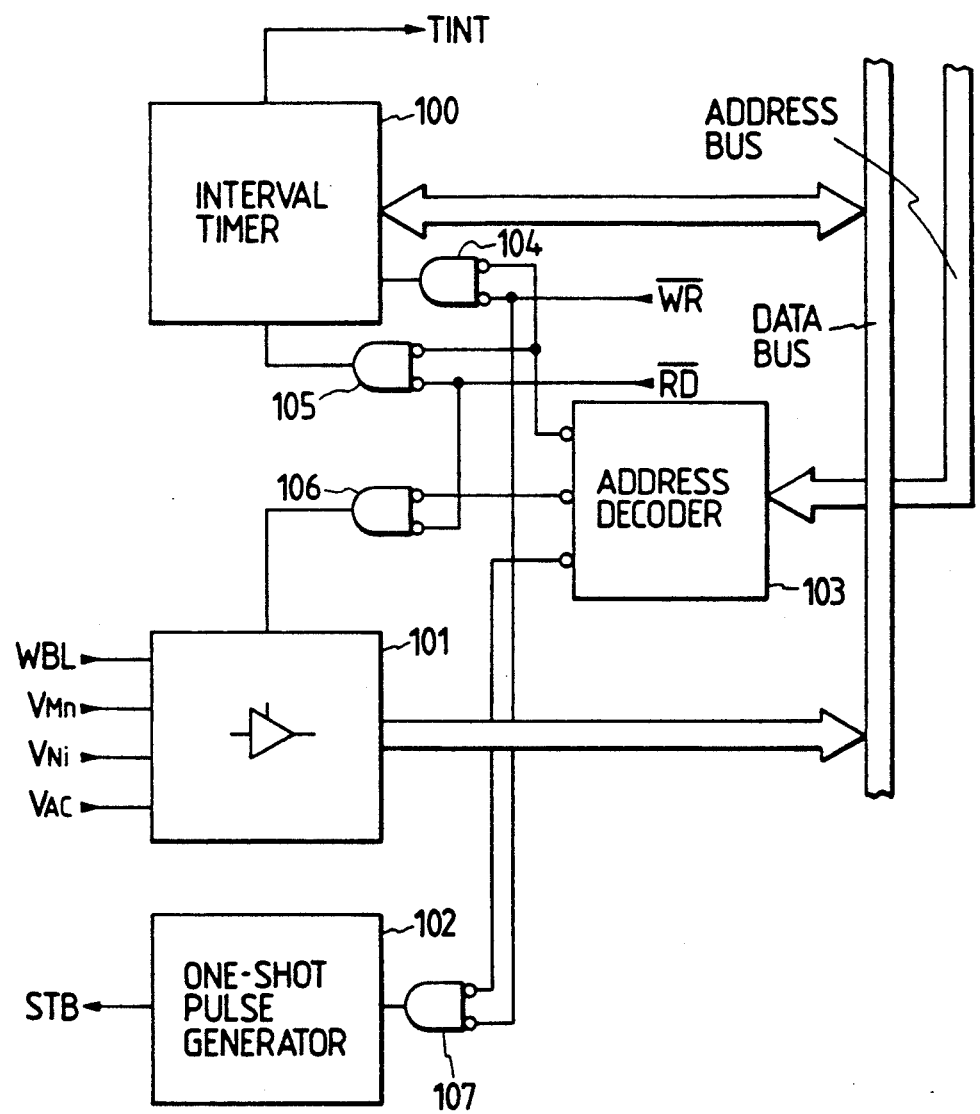

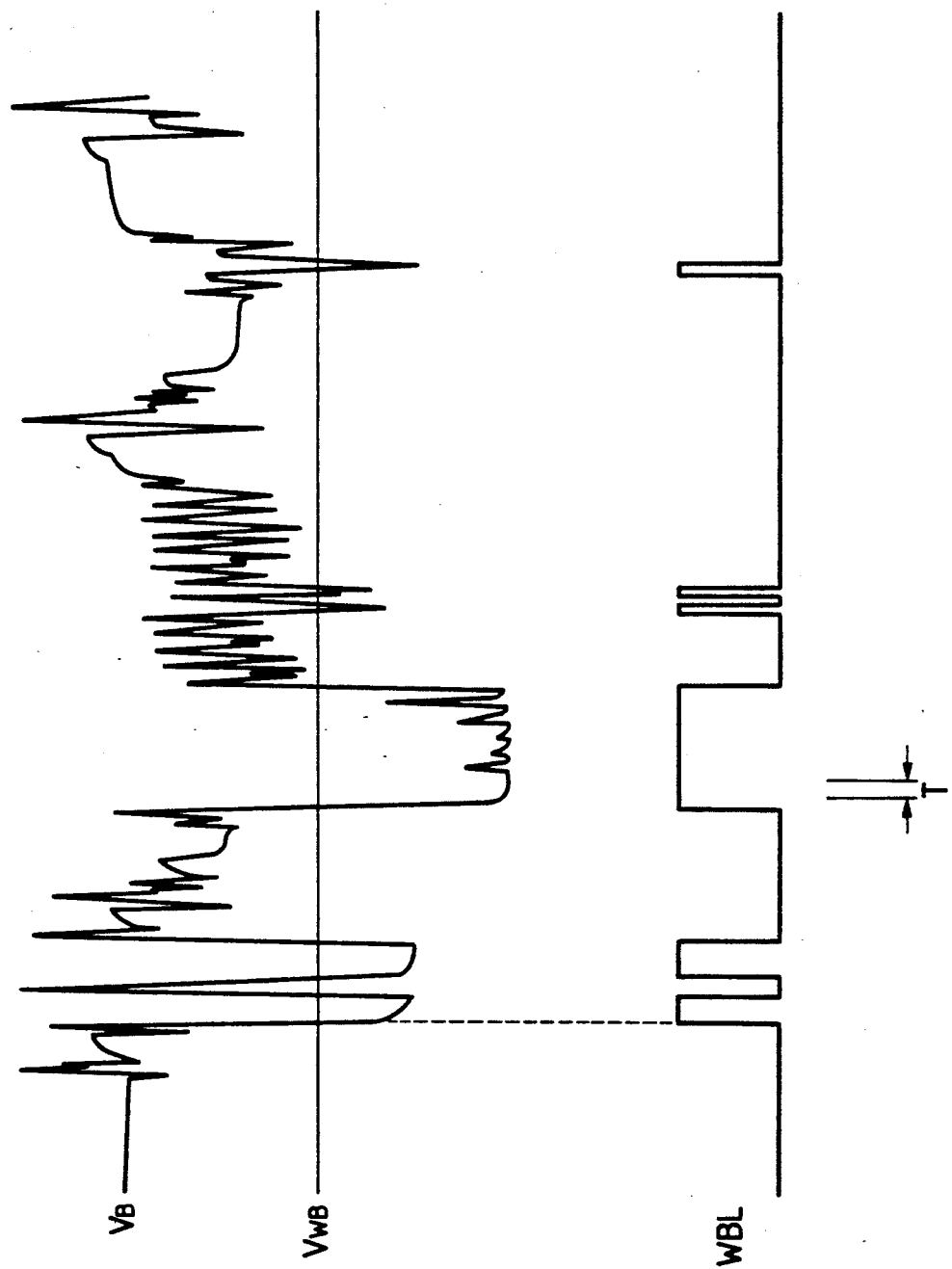

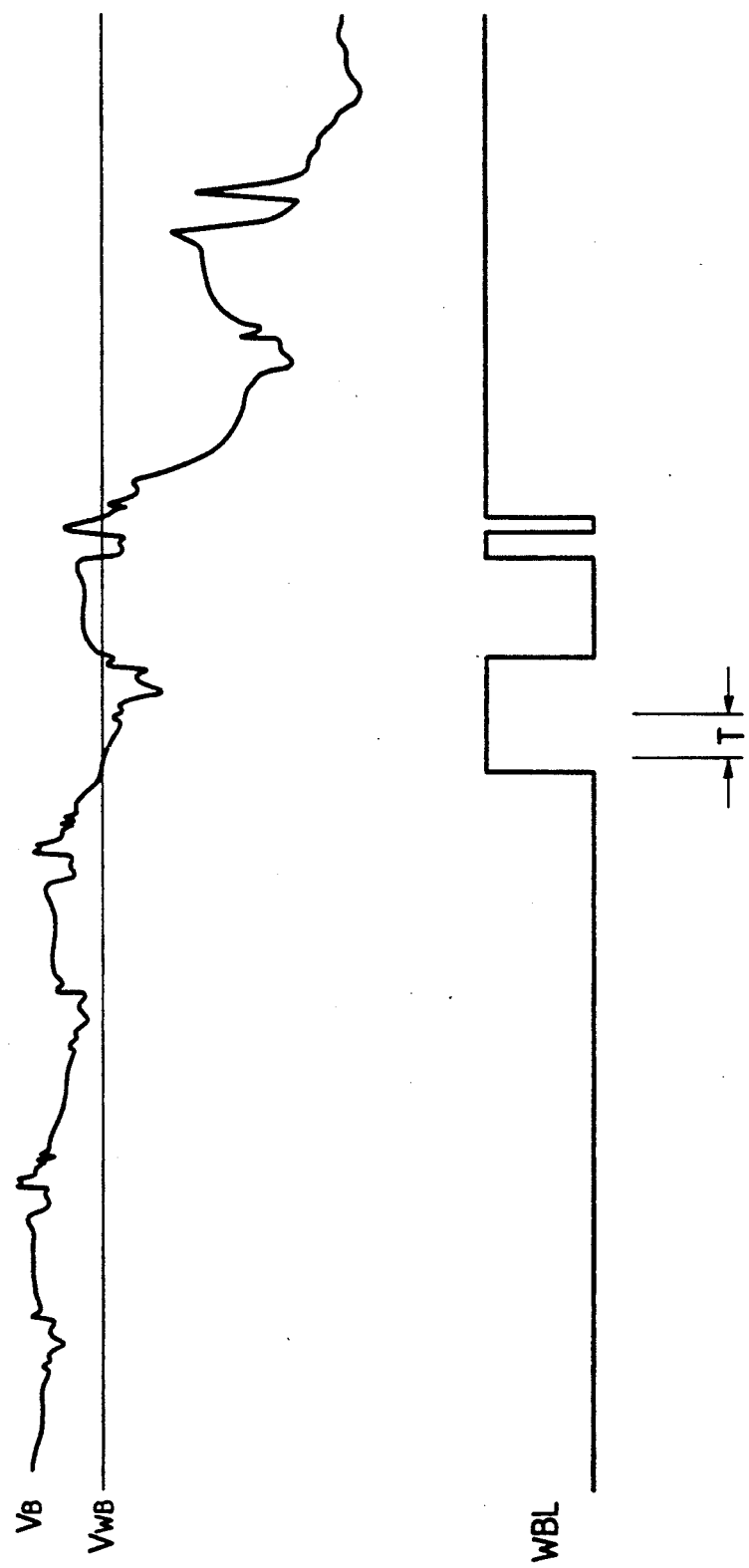

ELECTRONIC SYSTEM TO DISCRIMINATE A PLURALITY OF POWER SOURCES

BACKGROUND OF THE INVENTION

1. Field of the Invention

The present invention relates to an electronic system and, more particularly, to an electronic system in which a multipower source type is used as a power source.

2. Related Background Art

In such systems, a plurality of batteries are used as a plurality of power sources. In this case, the above system detects electric power consumption of the battery itself by a voltage drop state of the battery and to inform the user of the time to exchange the battery on the basis of the detected electric power consumption state. Even in the case where a multipower source (dry batteries, alkaline batteries, AC adapters, etc.) type is used as power sources of the system having such functions, the detection value of the voltage when the above functions are made operative is constant.

On the other hand, in the case of using various kinds of batteries as power sources, if the battery shapes are similar, although the various kinds of batteries can be inserted into battery boxes, the kind of battery inserted in the battery box cannot be discriminated from the outside.

Therefore, the case of using dry batteries (manganese batteries) as power sources and the case of using nickel-cadmium batteries as power sources will be first considered. A voltage ($V_B$) of battery gradually drops in dependence on its electric power consumption state. FIGS. 19A and 19B show voltage drop states. In both diagrams, a state of a change in each voltage drop when a load fluctuation is small is shown. For instance, in an apparatus such as a typewriter or the like for making a printer operative, since the loads when a motor is rotating and when the motor stops differ, widely the voltage $V_B$ gradually changes while increasing and decreasing. Particularly, in the case of the manganese battery shown in FIG. 19A, since its internal resistance is high, a tendency of the fluctuation is typical. However, when a voltage average value per certain unit time is calculated, a voltage drop phenomenon as shown in FIG. 19A appears. In FIG. 19A, point E denotes a voltage at which the driving of the apparatus as a load can be compensated. Since the internal resistances of the manganese battery and nickel-cadmium battery actually differ, the voltage drops in the case of extracting the same load differ and the performances of the batteries are also variable, so that the positions of the E points shown in the diagrams are not always coincident. However, in the specification, it is assumed that the positions of points E coincide for convenience of explanation. When the changes in the voltages $V_B$ shown in FIGS. 19A and 19B are compared, generally, it can be said that there is a feature such that although the nickel-cadmium battery holds an almost predetermined voltage level near the initial voltage value until a certain time as compared with that of the manganese battery, the voltage suddenly drops after that.

In the electronic system using two kinds of batteries as mentioned above, if weak battery voltages (hereinafter, referred to as "WB") in the case of informing the user of the battery changing timings by the voltage $V_B$ of the power source are set to the same value, there are the following drawbacks.

For instance, when $WB=WB_1$, in the case of the nickel-cadmium battery shown in FIG. 19B, the battery life is short to a certain extent at the point of $WB_1$ and the time of $t_3$ until point E remains. On the other hand, in the case of the manganese battery shown in FIG. 19A, the time $t_1$ remains at the point of $WB_1$ until point E and an enough long life still remains. When setting to $WB=WB_1$ as mentioned above, although it is ideal for the nickel-cadmium battery, in such a range, the manganese battery can be still sufficiently useful and the timing of point $WB_1$ is improper to generate an alarm to the user.

Then, in the case of setting to $WB=WB_2$, in the manganese battery shown in FIG. 19A, the time $t_2$ remains until point E and the remaining life is shortened to a certain degree. On the other hand, in the nickel-cadmium battery shown in FIG. 19B, the very short time of $t_4$ remains until point E. As mentioned above, when setting $WB=WB_2$, although such a point is proper for the manganese battery, only an extremely short time of $t_4$ remains for the nickel-cadmium battery. Even if an alarm is generated to the user at the time point of $WB_2$, there is not sufficient time until point E. It is considered that the absence of a sufficient time range causes a step-out of the motor at the time point exceeding point E if the user continuously uses the motor without becoming aware of the alarm during the operation, for instance, when the user is printing by means of the typewriter or the like.

As mentioned above, in the case of measuring the power voltage drop and setting the point of WB, if power sources of different characteristics are used, when the user intends to set the value of WB to a predetermined single point independently of the kinds of power sources, unreasonableness occurs that is disadvantageous to the user of the system.

On the other hand, when the voltages are detected at the same timing irrespective of the kinds of batteries, if the characteristics are matched with the characteristics of the voltage drop of one battery, they do not coincide with the characteristics of the voltage drop of the other battery. Thus, there occurs an inconvenience such that a possibility in which the voltage detecting point of the other battery becomes improper is high.

Further, in the case of displaying a residual amount of the battery capacity step by step, in order to calculate a percentage of electric power consumption of the battery on the basis of the battery voltage in accordance with the kind of battery, it is impossible to discriminate those percentage values by the same voltage value in both batteries. On the other hand, since the voltage drop phenomena of the batteries change depending on a load, it is impossible to measure the electric power consumption of the batteries with the same timing.

On the other hand, when the kind of internal battery cannot be discriminated from the outside, if the battery enters the state of WB, the battery cover must be opened every time and the kind of battery inserted in the battery box must be checked by the eyes. For instance, when the battery enters the WB state, as a method of recovering the power source, in the case of the nickel-cadmium battery, it is necessary to charge it by an AC power source. On the other hand, in the case of a dry battery, a new battery is necessary. In such a case, since the kind of internal battery cannot be discriminated from the outside, the user cannot immediately determine by which method the power source should be recovered.

SUMMARY OF THE INVENTION

It is an object of the invention to provide an electronic system in which an electric power consumption state of a power source can be known at a proper voltage value or timing in accordance with the kind of power source.

Another object of the invention is to provide an electronic system in which the kind of power source can be easily checked.

According to the invention, the discriminating means discriminates the kind of power source and the setting means sets the detection voltage on the basis of the kind of power source, so that the detection voltage can be variably set in accordance with the kind of power source.

On the other hand, the discriminating means discriminates the kind of power source and the setting means sets the interval of the voltage detecting time on the basis of the kind of power source, so that the interval of the voltage detecting time can be variably set in accordance with the kind of power source.

Further, since the display means displays the kind of power source which was discriminated by the discriminating means and the like, the user can check the kind of power source and the like by the eyes.

BRIEF DESCRIPTION OF THE DRAWINGS

FIG. 3 is a circuit diagram schematically showing a construction of a power source controller;

FIGS. 6 and 7 are diagrams showing examples of fluctuations of voltages $V_B$ near the WB level of the manganese battery and the nickel-cadmium battery, respectively;

DETAILED DESCRIPTION OF THE PREFERRED EMBODIMENTS

Preferred embodiments according to the present invention will be described in detail hereinbelow with reference to the drawings.

First Embodiment

The first embodiment will be first described.

Figure 1:
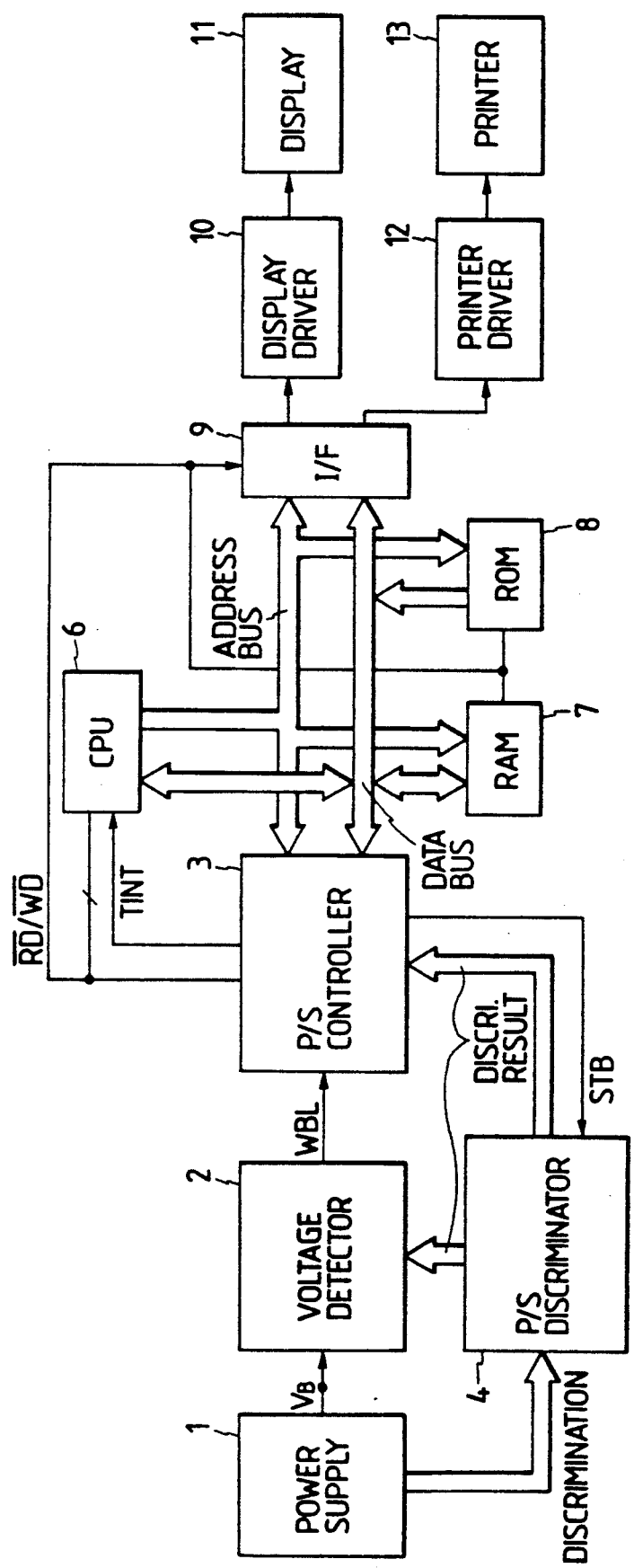
FIG. 1 is a block diagram showing an arrangement of the first embodiment according to the invention.

FIG. 1 is a block diagram showing an arrangement of the first embodiment according to the invention. In the diagram, reference numeral 1 denotes a power supply circuit as a main circuit to supply as a power source of the system and 2 indicates a voltage detector to detect whether the voltage $V_B$ which is supplied from the power supply circuit 1 has dropped to a predetermined voltage value (corresponding to WB) or less or not. Batteries having various characteristics can be used in the power supply circuit 1 as will be explained herein later. Reference numeral 4 indicates a power source (P/S) discriminator to discriminate the kind of battery set in the power supply circuit 1 on the basis of a discrimination signal from the power supply circuit, 1. The P/S discriminator 4 outputs the result of the discrimination to the voltage detector 2. Reference numeral 3 denotes a power source (P/S) controller for executing the operation of transmitting a detection signal (hereinafter, referred to as a "WBL signal") detected by the voltage detector 2 and a discrimination result signal discriminated by the P/S discriminator 4 to a CPU 6 through a data bus, the operation to interrupt the CPU 6 every predetermined time, and the operation to of generating a signal to keep the state in the P/S discriminator 4.

Reference numeral 6 indicates the CPU comprising a microprocessor and the like for controlling various arithmetic operations, the transmission and reception of data for each device, or the whole system. Reference numeral 8 indicates a ROM in which a control program to make the CPU 6 operative, an error processing program, a program according to a flow chart of FIG. 11, which will be explained hereinlater, and the like are stored. A table in which parameter values are stored, various kinds of data such as character fonts, and the like are also stored in the ROM 8. Reference numeral 7 indicates a RAM which is used as a work area for each process of the CPU 6 and an area to temporarily store various data and the like.

Figure 14:
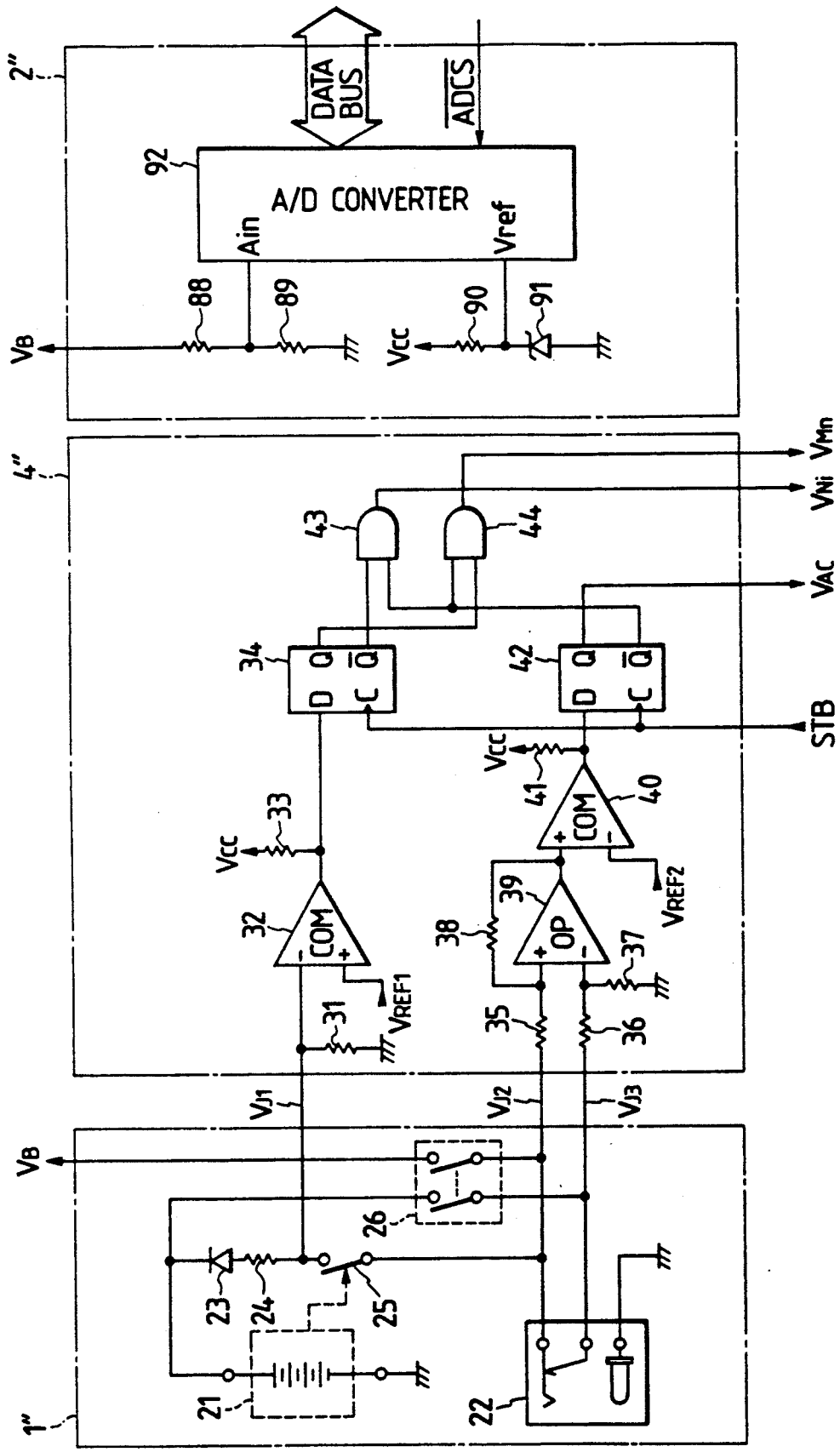
FIG. 14 is a circuit diagram showing constructions of a power supply circuit, a voltage detector, and a power source discriminating circuit in the third embodiment.

Reference numeral 11 represents a display to display characters, a power source used, or a WB state as shown in FIG. 14, which will be explained hereinlater; 10 denotes a display driver to drive the display 11; 13 a printer to print sentences, figures, and the like; 12 a printer driver to drive the printer 13; and 9 an interface (I/F) circuit to transfer the display data, print data, and the like transmitted from the CPU 6 through the data bus to the display driver 10 and the printer driver 12.

Figure 2:
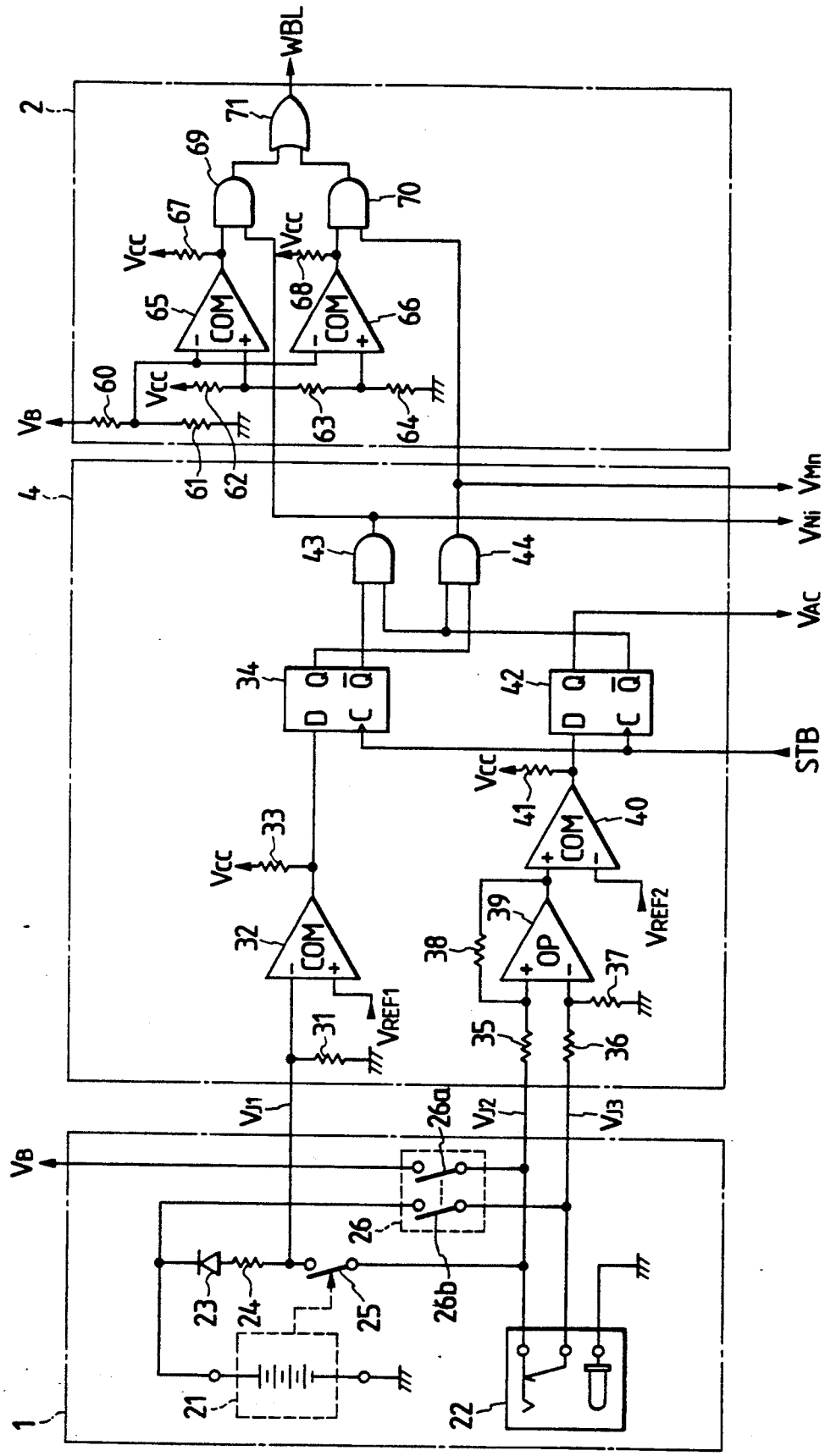
FIG. 2 is a circuit diagram showing constructions of a power supply circuit, a voltage detector, and a power source discriminator in the first embodiment.
Figure 4A:
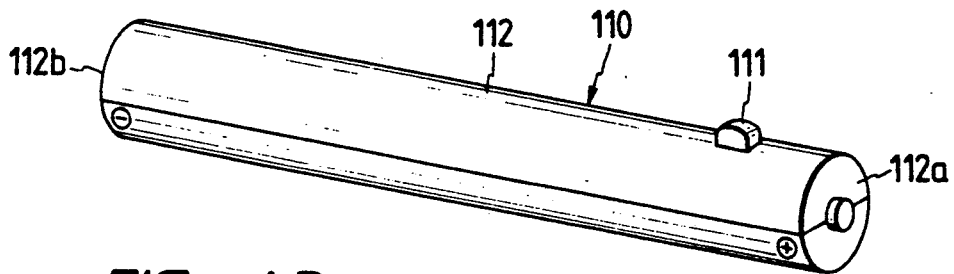
FIGS. 4A and 4B are external perspective views showing constructions of a nickel-cadmium battery and a manganese battery, respectively.
Figure 4B:
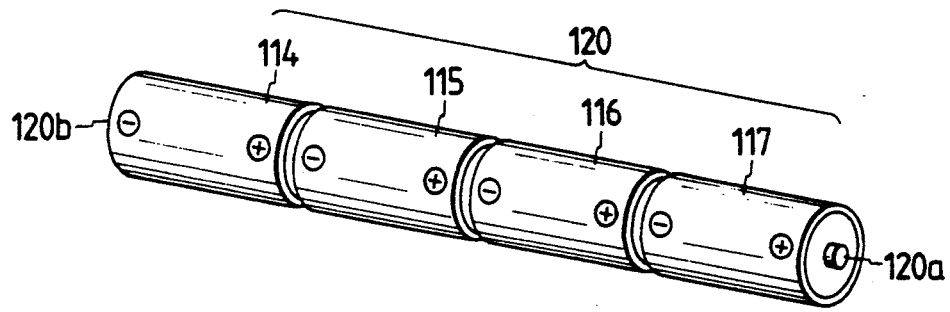

A main section of the above electronic system will now be described in detail. FIG. 2 is a circuit diagram showing constructions of the power supply circuit 1, voltage detector 2, and P/S discriminator 4 in the first embodiment. FIGS. 4A and 4B are external perspective view showing constructions of a nickel-cadmium battery and a manganese battery, respectively.

The power supply circuit 1 will be first described. In FIG. 2, reference numeral 21 denotes a battery which is used as a power source. In the first embodiment, either a nickel-cadmium battery 110 shown in FIG. 4A or a manganese battery 120 shown in FIG. 4B can be inserted. The nickel-cadmium battery 110 shown in FIG. 4A is constructed in a manner such that a plurality of battery cells which are serially connected are built in a cylindrical hard casing 112 having a projecting portion 111 to turn on a charging switch 25 (FIG. 2). The nickel-cadmium battery 110 can be charged and discharged and can be repetitively used many times by charging. A polarity on the side of one edge surface 112a of the hard casing 112 is set to a plus terminal side, while a polarity on the side of the other edge surface 112b is set to a minus terminal side. On the other hand, the manganese battery 120 shown in FIG. 4B is constructed in a manner such that, in the example shown in the diagram, four commercially available batteries 114, 115, 116, and 117 are serially connected. A polarity on the side of one edge surface 120a is set to a plus terminal side, while a polarity on the side of the other edge surface 120b is set to a minus terminal side.

Different from the above nickel-cadmium battery 110, the manganese battery 120 cannot be charged after the capacity has once been consumed, so that it must be thrown away. In the first embodiment, the outer shape of the nickel-cadmium battery 110 is designed into the almost same size as the manganese battery 120 and the battery 110 can be inserted into the same battery box of the system.

Figure 5A:
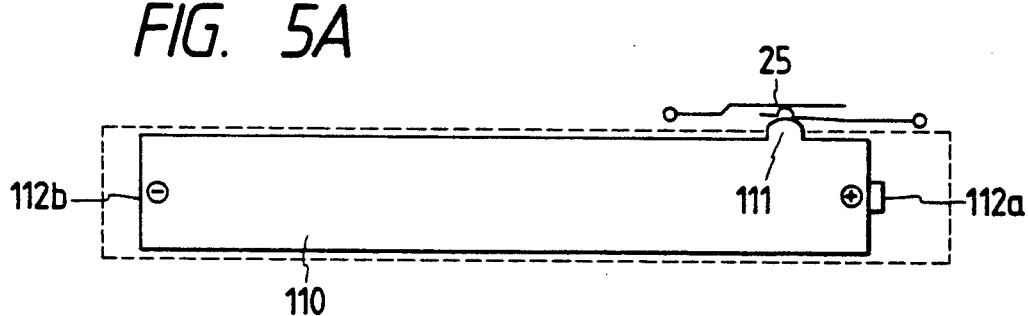
FIG. 5A is a diagram showing a state of a switch when the nickel-cadmium battery according to the first embodiment is inserted.
Figure 5B:
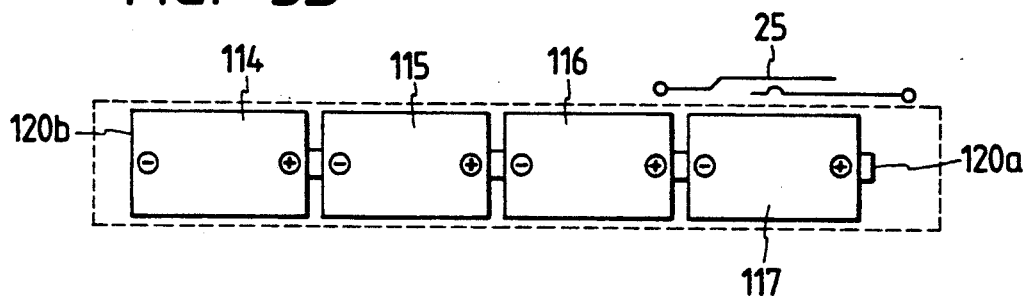
FIG. 5B is a diagram showing a state of a switch when manganese batteries are inserted or when no battery is inserted.

In FIG. 2, reference numeral 25 denotes a charging switch of the nickel-cadmium battery. The switch 25 is turned on when the nickel-cadmium battery 110 is set as a battery 21. The switch 25 is turned off when the manganese battery 120 is set or when none of the nickel-cadmium battery and the manganese battery is set. FIGS. 5A and 5B show switching states of the switches 25 of the nickel-cadmium battery 110 and the manganese battery 120.

FIG. 5A shows the state of the switch 25 when the nickel-cadmium battery 110 according to the first embodiment is set. As shown in the diagram, both terminals of the switch 25 are come into contact with each other by a projecting portion 111, so that the switch 25 is turned on. On the other hand, FIG. 5B shows the state of the switch 25 when the manganese battery 120 is set or when the battery 21 is not set. As shown in the diagram, since the switch 25 is open, it is turned off. As mentioned above, since the switch 25 is connected when the nickel-cadmium battery 110 is set, the battery 110 can be charged if an AC adapter is connected to an AC adapter jack 22. When the AC adapter is connected to the jack 22, terminals $V_{J2}$ and $V_{J3}$ connecting the power supply circuit 1 and P/S discriminator 4 are set into the contactless state and an electric power is supplied from the AC adapter to the system. In this case, a charging current to the nickel-cadmium battery 110 flows from the terminal $V_{J2}$ of the AC adapter jack 22 through the switch 25, a resistor 24, and a diode 23. Reference numeral 24 denotes the resistor to limit the charging current and 23 indicates the diode to cut the current flowing from the battery 21 to the AC adapter. When the manganese battery 120 is set to the battery 21, even if the AC adapter is connected, the switch 25 is open as mentioned above, so that no charging current flows. On the other hand, when the AC adapter is not connected to the jack 22, the terminals $V_{J2}$ and $V_{J3}$ are in contact with each other, so that an electric power is supplied from the battery 21 to the system. Reference numeral 26 denotes a power switch of the system. The following two paths can be simultaneously shut off by the power switch 26. One of the paths is independently controlled by turning on/off the electric power supply from the AC adapter or battery 21 by a switch 26a. The other path is independently controlled by turning on/off the electric power supply from the battery 21 by a switch 26b.

The P/S discriminator 4 will now be described.

In FIG. 2, reference numeral 32 denotes a comparator to check that the nickel-cadmium battery 110 has been set to the battery 21; 31 a resistor to decide the level on the minus terminal side of the comparator 32; 33 a resistor to decide the output level of the comparator 32 on the basis of the transistor transistor logic (TTL) level; 39 a differential operational amplifier to generate an output voltage when the AC adapter is connected; 35, 36, 37, and 38 resistors to determine the ratio between the voltage across two input terminals of the differential operational amplifier 39 and the differential output voltage; 40 a comparator to discriminate whether the output voltage of the differential operational amplifier 39 when the AC adapter is connected has been set to the specified value or not; 41 a resistor to decide the output level of the comparator 40 by the TTL level; and 34 and 42 D-type latch circuits to hold outputs of the comparators 32 and 40. A Q output of the D-type latch circuit 42 is used as a signal to discriminate whether the AC adapter is effective/ineffective. Reference numerals 43 and 44 denote AND circuits to discriminate whether the nickel-cadmium battery and manganese battery are effective/ineffective from the results of the outputs of the D-type latch circuits 34 in 42.

With reference to the following table, explanation will now be made with respect to a change in discrimination result signal $V_{AC}$ indicative of the result of the discrimination when the P/S discriminator 4 with the above construction discriminates whether an electric power has been supplied from the AC adapter or not on the basis of the setting state of the power source in the power supply circuit 1 and changes in discrimination result signals $V_{Ni}$ and $V_{Mn}$ indicative of the results of the discrimination regarding whether an electric power has been supplied from the nickel-cadmium battery 110 or the manganese battery 120 or not.

TABLE

| State of power source used | | No. 1 | No. 2 | No. 3 | No. 4 | No. 5 |
|---|---|---|---|---|---|---|
| Power source | AC adapter | O | O | O | X | X |
| | Nickel-cadmium battery | X | O | X | O | X |

TABLE-continued

| State of power source used | | No. 1 | No. 2 | No. 3 | No. 4 | No. 5 |
|---|---|---|---|---|---|---|
| Manganese battery | | X | X | ○ | X | ○ |
| Discrimination signal | $V_{J1}$ | L | H | L | H | L |
| | $V_{J2}:V_{J3}$ | $V_{J2}>V_{J3}$ | $V_{J2}>V_{J3}$ | $V_{J2}>V_{J3}$ | $V_{J2}=V_{J3}$ | $V_{J2}=V_{J3}$ |
| Discrimination result signal | $V_{AC}$ | H | H | H | L | L |
| | $V_{Ni}$ | L | L | L | H | L |
| | $V_{Mn}$ | L | L | L | L | H |

Note)
○: inserted, X: not inserted, H: voltage "H" level, L: voltage "L" level

In the above Table, the state of the power source used is classified into five states of Nos. 1 to 5. First, the states Nos. 1 to 3 will be described.

The using states Nos. 1 to 3 relate to the case where the AC adapter is connected to the AC adapter jack 22. In this case, there is a relation of $V_{J2}>V_{J3}$ between the voltages at the terminals $V_{J2}$ and $V_{J3}$ in all of the states Nos. 1 to 3. In the state No. 1, since none of the nickel-cadmium battery and the manganese battery is set to the battery 21, no current flows through the resistors 36 and 37 and the voltage of the terminal $V_{J3}$ is set to the ground (GND) level. On the other hand, since a positive voltage of the AC adapter is generated at the terminal $V_{J2}$, the relation of $V_{J2}>V_{J3}$ is derived.

Figure 10:
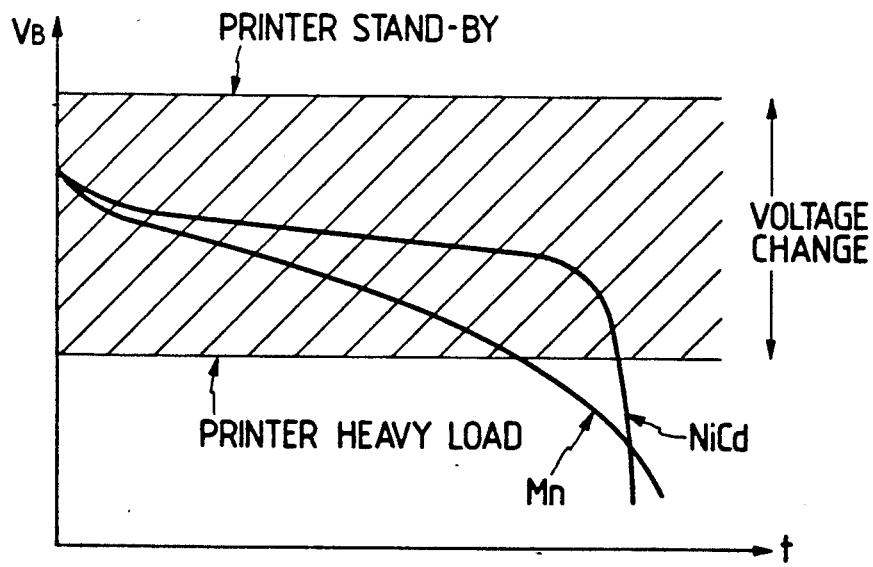
FIG. 10 is a diagram showing the relation of magnitudes of a voltage of an AC adapter and a voltage of a battery.

In the next state No. 2 or 3, a positive voltage by the AC adapter is generated on the terminal $V_{J2}$ side in a manner similar to the case of the state No. 1 or a positive voltage by the battery 21 is generated on the terminal $V_{J3}$ side. FIG. 10 shows the relation between the magnitudes of the voltage by the AC adapter and the voltage by the battery 21. According to FIG. 10, the voltage $V_B$ changes due to a load fluctuation in all of the AC adapter, nickel-cadmium battery 110, and manganese battery 120. In the voltage fluctuation of the AC adapter, there occurs a situation such that the voltage is lower than the voltages of the manganese battery 120 and nickel-cadmium battery 110 in dependence on the load state. However, in the printer standby mode of a small load in which the printer operation is not executed or the like the voltage of the AC adapter holds an almost predetermined voltage. As shown in FIG. 10, if the voltage of the AC adapter at that time is preliminarily designed so as to be higher than the voltages in the initial states of the nickel-cadmium battery 110 and manganese battery 120, the relation of $V_{J2}>V_{J3}$ is obtained in the printer standby mode. On the other hand, in the P/S discriminator 4, a state signal which is obtained from the relation between $V_{J2}$ and $V_{J3}$ in the printer standby mode is held in the D-type latch circuit 42 by generating a strobe (STB) signal from the P/S controller 3 in the standby mode. Further, a discrimination signal $V_{J1}$ to discriminate whether the nickel-cadmium battery 110 has been inserted or not is also held by the D type latch circuit 34. Thus, if the relation of $V_{J2}>V_{J3}$ is obtained in the states Nos. 1 to 3 of the power source used, a positive voltage of a predetermined level or higher is derived at an output of the differential operational amplifier 39. At this time, a voltage $V_{REF2}$ of a minus (−) terminal of the comparator 40 is previously selected so that the "H" level voltage is input to a D input terminal of the D-type latch circuit 42. When the "H" level input voltage is latched into the D-type latch circuit 42 by the STB signal, a signal of a Q output terminal $V_{AC}$ is set to the "H" level voltage. On the other hand, an "L" level voltage is output from a $\overline{Q}$ output terminal of the D-type latch circuit 42. Since the "L" level signal is input to the AND circuits 43 and 44, the "L" level voltage signals $V_{Ni}$ and $V_{Mn}$ are output from the AND circuits 43 and 44 irrespective of the state of $V_{J1}$. Thus, in all of the power source states Nos. 1 to 3, the discrimination result signals of $V_{AC}=$"H" and $V_{Ni}=V_{Mn}=$"L" are derived.

The state No. 4 of the power source used will now be described. The state No. 4 relates to the case where only the nickel-cadmium battery 110 is inserted. When the AC adapter is not connected, the terminals $V_{J2}$ and $V_{J3}$ are connected, so that no voltage difference is caused between $V_{J2}$ and $V_{J3}$. Therefore, the output voltage of the differential operational amplifier 39 is lower than that in the case where the AC adapter is connected. An output of the comparator 40 is set to the "L" level due to the predetermined voltage value $V_{REF2}$. By latching the level state into the D-type latch circuit 42, the discrimination result signal $V_{AC}$ is set to the "L" level. When $V_{AC}=$"L", since one input terminal of each of the AND circuits 43 and 44 is set to the "H" level, outputs of the AND circuits 43 and 44 are determined by the input signal levels of the other input terminals thereof. In the state No. 4, since the switch 25 is ON as will be understood from the explanation of the power supply circuit 1 mentioned above, a current flows from the battery 21 to the resistor 31, so that an "H" level voltage is generated to the minus (−) input terminal of the comparator 32. At this time, the value of $V_{REF1}$ at the plus (+) input terminal of the comparator is previously selected so that the output of the comparator 32 is set to the "L" level. On the other hand, when the D-type latch circuit 34 holds a D=L" state by the STB signal and an "L" level signal is output from the Q terminal and an "H" level signal is output from the $\overline{Q}$ terminal, the results of $V_{Ni}=$"H" and $V_{Mn}=$"L" are obtained by the AND circuits 43 and 44.

As mentioned above, in the power source state of No. 4, the discrimination result signals of $V_{AC}=$"L", $V_{Ni}=$"H", and $V_{Mn}=$"L" are obtained.

The state No. 5 of the power source used will now be described. In this state, since only the manganese battery 120 is inserted and the AC adapter is not connected in a manner similar to the case of the state No. 4 mentioned above, $V_{AC}=$"L" is obtained from the description of the state No. 4. On the other hand, since the switch 25 is off (open) from the description of the power supply circuit 1, the pull-down of the (−) input terminal of the comparator 32 is caused by the resistor 31, so that the (−) input terminal thereof is set to the "L" level. By the voltage value of $V_{REF1}$ which has already been determined, the output signal of the comparator 32 is set to the "H" level and the "H" level output signal is held by the D-type latch circuit 34, an output signal from the Q terminal of the latch circuit 34 is set to the "H" level (Q="H"), and an output signal from the $\overline{Q}$ terminal is set to the "L" level ($\overline{Q}$="L"), and these output signals are set to $V_{Ni}=$"L" and $V_{Mn}$="H" by the AND circuits 43 and 44, respectively. Thus, in the power source state No. 5, the discrimination result signals which are expressed by $V_{AC}$="L", $V_{Ni}$="L", and $V_{Mn}$="H" are derived.

An internal construction of the voltage detector 2 shown in FIG. 2 will now be described. In FIG. 2, reference numerals 60 and 61 denote resistors to divide the power source voltage $V_B$; 62, 63, and 64 indicate resistors to form a reference voltage of WB; 65 and 66 comparators to compare the divided power source voltage and the reference WB voltage; 67 and 68 resistors to decide outputs of the comparators 65 and 66 by the TTL levels; 69 and 70 AND circuits to select the output signals of the comparators 65 and 66 by the signals $V_{Ni}$ and $V_{Mn}$; and 71 an OR circuit which receives output signals of the AND circuits 69 and 70. In the above construction, in the states Nos. 1 to 3 of the power source used in the above Table, both of the discrimination result signals $V_{Ni}$ and $V_{Mn}$ are set to the "L" level. Therefore, the output signals of the AND circuits 69 and 70 are set to the "L" level and an output signal WBL of the OR circuit 71 is fixed to the "L" level irrespective of the level of the voltage $V_B$.

Figure 19A:
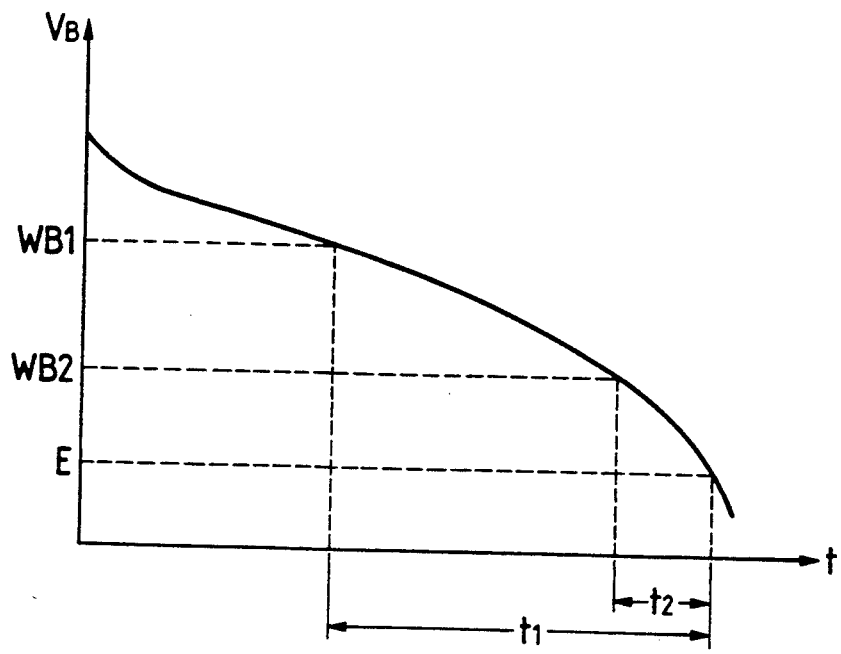
FIGS. 19A and 19B are graphs showing states of voltage drops of batteries, respectively.
Figure 19B:
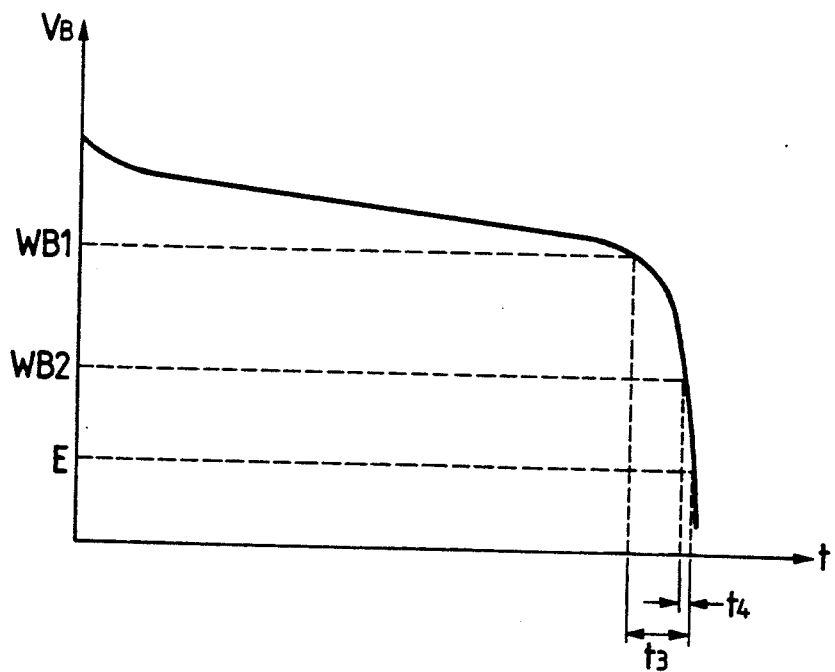

In the state No. 4, since $V_{Ni}$="H" and $V_{Mn}$="L", the output result of the comparator 65 is directly output as a WBL signal. When the voltage obtained by dividing the voltage $V_B$ is lower than the voltage obtained by dividing a voltage $V_{cc}$ by the resistance value of the resistor 62 and the total resistance value of the resistors 63 and 64, the output level of the comparator 65 changes from "L" to "H" and the level of the WBL also changes from "L" to "H". Since the WBL is set to the "H" level, the voltage drop of the battery voltage $V_B$ is detected. On the other hand, in the state No. 5 of the power source used, the output of the comparator 66 is fetched as a WBL signal. In this case, when the divided voltage of $V_B$ is lower than the voltage obtained by dividing $V_{cc}$ by the total resistance value of the resistors 62 and 63 and the resistance value of the resistor 64, the WBL level changes from "L" to "H". The detection voltage at the WB signal level of the battery voltage is arbitrarily set by selecting the resistance values of the resistors 60, 61, 62, 63, and 64 to proper values, respectively. In the first embodiment, from the characteristics of the voltage effect of the battery shown in FIG. 19, the WB level of the nickel-cadmium battery is set to be higher than the WB level of the manganese battery.

From the constructions of the power supply circuit 1, P/S discriminator 4, and voltage detector 2 shown in FIG. 2, the states of the power source used shown in the above Table can be discriminated and the WB level can be set in accordance with the kind of power source used.

The P/S controller 3 will now be described.

FIG. 3 is a circuit diagram schematically showing a construction of the P/S controller 3. In FIG. 3, reference numeral 100 denotes an interval timer to interrupt the CPU 6 at a predetermined time interval; 101 indicates a tristate input buffer to transfer the signals WBL, $V_{Ni}$, $V_{Mn}$, and $V_{AC}$ by the data bus; 102 a one-shot pulse generator to generate the STB signal for allowing the D-type latch circuits 34 and 42 to latch; 103 an address decoder to form selection signals of the interval timer 100, tristate input buffer 101, and one-shot pulse generator 102 by an address signal from an address bus, respectively; and 104, 105, 106, and 107 AND circuits to calculate the AND of the selection signal of the address decoder 103 and either one of a WR (write) signal and an RD (read) signal, respectively. An arbitrary time value can be written from the CPU 6 into the interval timer 100. An interruption signal (hereinafter, referred to as a "TINT signal") is generated every predetermined time. On the other hand, in the first embodiment, the written timer value can be also read out. The address decoder 103 selects the tristate input buffer 101 by the selection signal, so that the CPU 6 can know the kind of effective power source in the power supply circuit 1 by checking the level stages of the signals $V_{Ni}$, $V_{Mn}$, and $V_{AC}$. The level state of the WBL signal can be also known. The CPU 6 discriminates whether the voltage level of the battery 21 has reached WB or not.

A feature depending on each kind of battery will now be described with respect to the WBL signal which is obtained from the voltage detector 2.

FIGS. 6 and 7 show examples of fluctuations of the voltage $V_B$ near the WB level of the manganese battery 120 and nickel-cadmium battery 110, respectively. The fluctuation states of the voltage $V_B$ shown in FIGS. 6 and 7 relate to the case where the printer is executing the printing operation. A load fluctuation at this time is fairly large. When comparing both of the voltage fluctuations, it will be obviously understood from FIGS. 6 and 7 that the voltage fluctuation of the manganese battery 120 is larger than the voltage fluctuation of the nickel-cadmium battery 110. On the other hand, as shown in FIG. 6, in the case of the manganese battery 120, even when the voltage level has once dropped to the WB level (hereinafter, referred to as a "$V_{WB}$"), the voltage $V_B$ is largely recovered due to the load conditions. However, as shown in FIG. 7, when the voltage of the nickel-cadmium battery 110 has once dropped to the WB level, the voltage $V_B$ is not largely recovered and the voltage changes along a locus in which it uniformly drops.

In the battery voltage which changes as mentioned above, when the WB level is detected by the voltage detector 2, the WBL signals regarding the manganese battery 120 and the nickel-cadmium battery 110 shown in FIGS. 6 and 7 are derived. When the WBL signal is at the "H" level, it indicates the WB level. First, in the case of the manganese battery 120, as shown in FIG. 6, although the time interval when the WBL signal is at the "H" level is short because of the characteristics of the voltage fluctuation of the battery, the "H" level repetitively appears On the other hand, in the case of the nickel-cadmium battery, as shown in FIG. 7, the time interval when WBL="H" is long and after the "H" level has once been specified, the voltage level hardly changes. From the above features, it is advantageous the value (T) of the interval timer to detect the voltage in the case of the manganese battery 120 is set to be smaller than that of the nickel-cadmium battery 110. On the other hand, if the timer values (T) of both batteries 110 and 120 are set to the same value, since the interruption signal in the case of the manganese battery 120 is set such that WBL="H", it is sufficient to set the number of detection times by the interruption to a small value. However, for the manganese battery 120, it is shown that the frequency of WBL="H" is high. From the above explanation, in the case where the state WBL="H" which is continuously detected by the TINT signals of a predetermined number of times or more was obtained a few times or more, it is determined that the voltage $V_B$ is at the WB level. According to a method of discriminating the WB level, the WB level suitable for the voltage drop characteristics of the manganese battery 120 can be accurately discriminated. On the other hand, in the case of the nickel-cadmium battery 110, when the voltage $V_B$ has reached WBL="H", since a large increasing/decreasing change is not seen, if the state of WBL="H" which is detected by the TINT signals which are continuously generated a predetermined number of times or more is detected even only one time, it is determined that the voltage $V_B$ is at the WB level. In this case, it is considered that not so large time error in discrimination of the WB level occurs.

According to the above-described first embodiment, the number ("SNUM", which will be explained hereinlater) of continuous TINT signals of WBL="H", the number ("WNUM", which will be explained hereinlater) of detection times of the "H" state in which the state of WBL="H" is obtained for a predetermined time or longer, or the detection interval timer value T is made variable in accordance with the kind of battery, thereby enabling the WB level to be accurately determined.

The display 11 will now be described.

Figure 9:
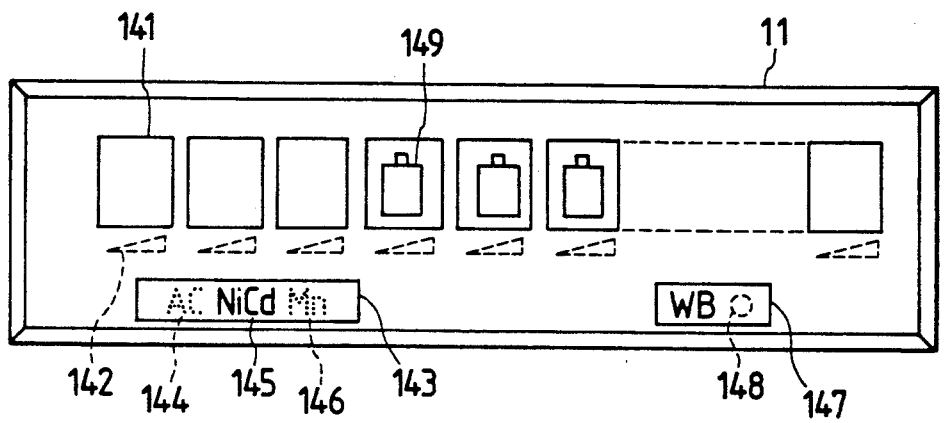
FIG. 9 is a front view for explaining a display screen of a display in the first embodiment.

FIG. 9 is a front view for explaining the display screen of the display 11 in the first embodiment. In the diagram, reference numeral 143 denotes a display frame of the power source used for displaying the kind of power source. In the display frame 143, reference numerals 144 to 146 indicate positions to display AC (AC adapter), NiCd (nickel-cadmium), and Mn (manganese), respectively. As shown in FIG. 9, the system is constructed such as to light on the denomination of the selected power source. In the example shown in FIG. 9, the display position 145 of NiCd is lit on at present. Reference numeral 141 denotes a mark display frame to display a battery mark 149; 142 indicates a cursor display position; and 147 a WB display frame. When it is decided that the voltage is at the WB level, by lighting up a WB indicator lamp 148 in the WB display frame 147, thereby warning to the user. In the WB display, the mark display frame 141 has the function to display the battery mark 149 every predetermined time.

Figure 11:
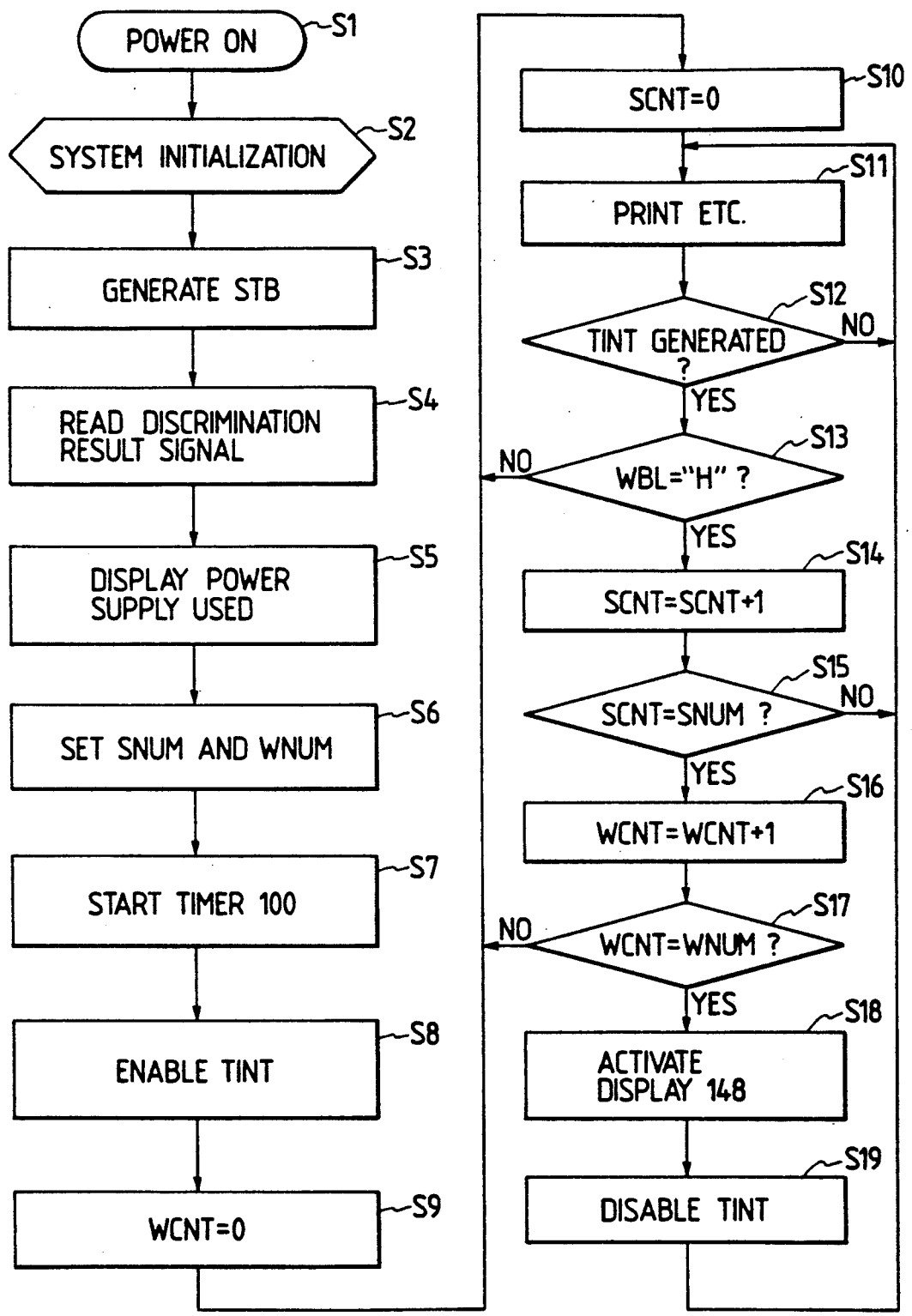
FIG. 11 is a flowchart for explaining the operation of a power supplying process in the first embodiment.

FIG. 11 is a flowchart for explaining the power source processing operation in the first embodiment.

First, when the power supply of the system is turned on by the switch 25, the CPU 6 starts the operation and starts the execution of the program (step S1). Then, the printer 13 and display 11 in the system or various set values are initialized (step S2). The STB signal to keep the state of power source used by the D-type latch circuits 34 and 42 is generated from the one-shot pulse generator 102 (step S3). The discrimination result signal obtained by the P/S discriminator 4 is read by the CPU 6 through the tristate input buffer 101 in the P/S controller 3 (step S4).

The kind of power source used is determined from the result of the discrimination which was read in step S4 and the kind of power source used is displayed in the display frame 143 of the power source used by the display 11 shown in FIG. 9 (step S5). Subsequently, the number (hereinafter, referred to as "SNUM") of continuous detection times and the number (hereinafter, referred to as "WNUM") of WB level detection times as parameters to discriminate the WB level are selected and read out of the table in the ROM 8 in accordance with the kind of power source used and the selected numbers are set into predetermined addresses in the RAM 7 (step S6). Then, the interruption interval time T to read out the WBL signal is also selected and read out of the table in the ROM 8 in accordance with the kind of power source used and is set into the interval timer 100 shown in FIG. 3. The interval timer functions so as to start the operation at the time point when the value T is set (step S7).

Then, the TINT signal of the interval timer 100 is enabled and the CPU 6 is interrupted every predetermined time (step S8). The count value (hereinafter, referred to as "WCNT") of the counter indicative of the number of detection times of the WB level is cleared (step S9). Subsequently, the count value (hereinafter, referred to as "SCNT") of the counter indicative of the number of continuous detection times is cleared (step S10). Then, various operations (printing and the like) which are executed by the system are performed (step S11) and the operations are continued until the timer interruption signal (TINT signal) is generated from the interval timer 100 (step S12). When the CPU 6 detects that the TINT signal was generated in step S12, the processing routine advances to the WB detecting operation. A signal indicative of whether the WBL signal from the voltage detector 2 to detect whether the power source voltage $V_B$ has reached the voltage WB or not has been set to the "H" level or not is read through the tristate input buffer 101. Thus, if WBL="L", the processing routine is returned to step S10 (step S13). On the contrary, if WBL="H", the SCNT is then increased by "1" (step S14) and a check is made to see if the value SCNT has reached the value SNUM which had been set into the RAM 7 or not. Thus, if SCNT<SNUM, the processing routine is returned to step S11 and various operations are executed until the next timer interruption signal is generated (step S15). On the other hand, if SCNT=SNUM, this means that the state of WBL="H" has been continued for a predetermined period of time or longer and that the voltage $V_B$ has approached the point of WB, so that the value of WCNT is increased by "1" (step S16). Then, the WCNT obtained in step S16 is compared with the WNUM which was set into the RAM 7 in step S6 and if the result is such that WCNT<WNUM, it is determined that the voltage $V_B$ does not reach the point of WB and the processing routine is returned to step S10 (step S17). On the other hand, if WCNT=WNUM, it is decided that the voltage $V_B$ is at the point of WB and the WB indicator lamp 148 in the WB display frame 147 is lit on (step S18). The voltage drop state is warned to the user by lighting on the WB indicator lamp 148.

Although not shown as a process in the flowchart of FIG. 11, after the voltage $V_B$ reached WB, the battery mark 149 is displayed in the character display frame 141 every predetermined time until the power switch 26 is turned off. After completion of the WB display, the TINT signal of the interval timer 100 is set to be disable, the processing routine is returned to step S11, and various operations such as printing and the like are continued (step S19). The WB display is held until the power switch 26 is turned off for the user to exchange or charge the battery.

Explanation will now be made with respect to changes in SCNT and WCNT of the counters depending on the timer interruption (TINT signal) and WBL signal until the WB display is executed.

Figure 8:
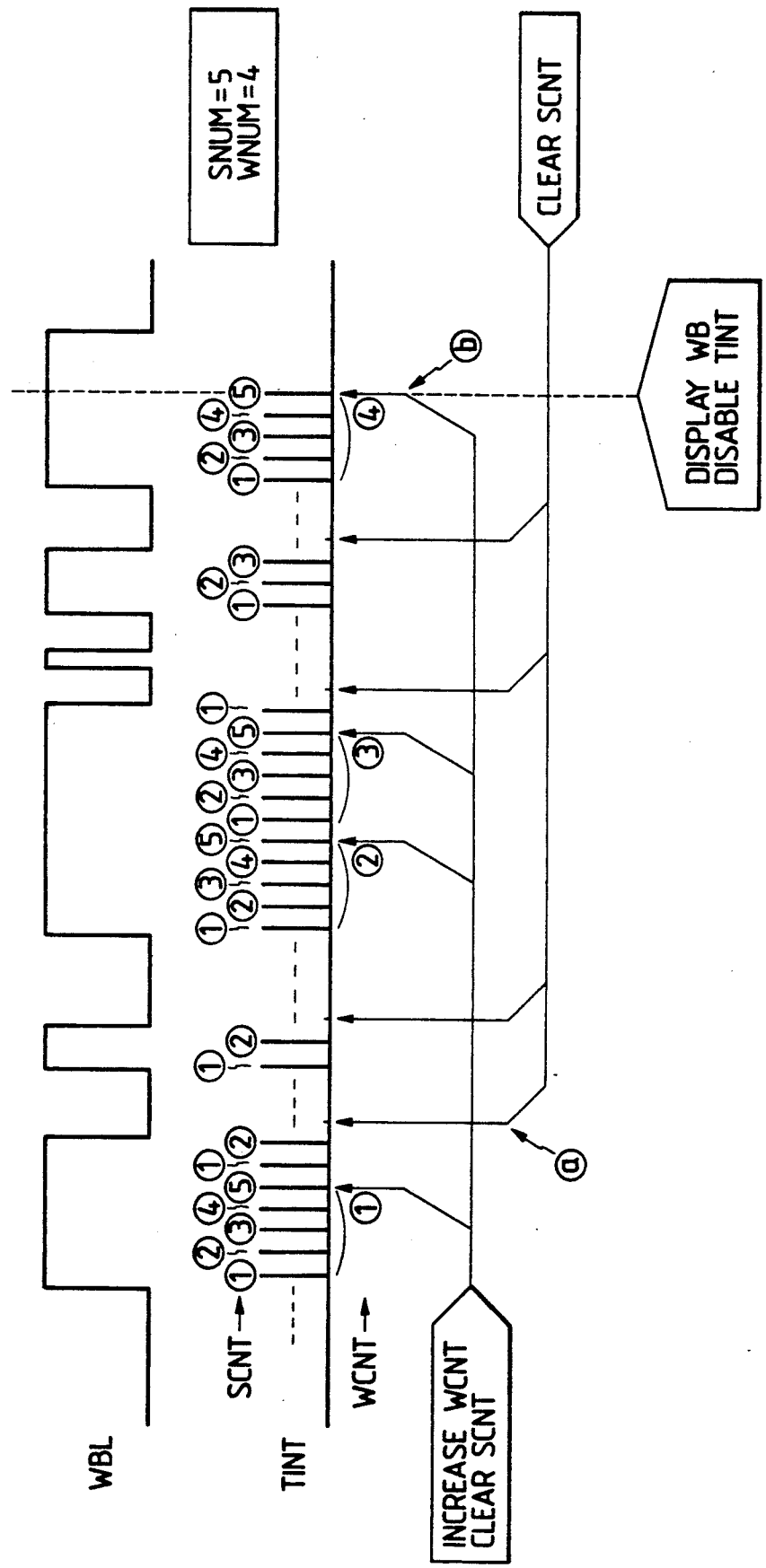
FIG. 8 is a diagram for explaining a change in count value of a counter in the first embodiment.

FIG. 8 is a diagram for explaining changes in count values of the counters in the first embodiment.

As an example, it is now assumed that SNUM=5 and WNUM=4 are first set in step S6. When WBL="H", if the interruption occurs by the TINT signal, the SCNT is counted up as shown in FIG. 8. When SCNT=SNUM, that is, when SCNT=5, the WCNT is increased by "1". At this time, the SCNT is cleared. After that, since the WBL signal is still at the "H" level, the SCNT was again counted up. However, at point ⓐ in the diagram, since WBL="L", the SCNT is cleared. After that, the SCNT and WCNT changes as shown in FIG. 8 and, finally, WCNT=WNUM=4 at point ⓑ (at this time, the SCNT is not cleared). Due to this, it is determined that the voltage $V_B$ is in the WB state and the WB indicator lamp 148 is lit on (WB display). Since the timer interruption at this time point is disabled, the timer interruption does not occur after that and the SCNT and WCNT do not change.

As described above, according to the first embodiment, since the consumption state of the battery which is used as a power source can be accurately checked by eye in accordance with the kind of battery, various batteries can be made the most of.

Second embodiment

The second embodiment will now be described.

Although a circuit construction of the second embodiment is almost similar to that of the first embodiment, constructions of the voltage detector 2 and P/S discriminator 4 differ.

Figure 12:
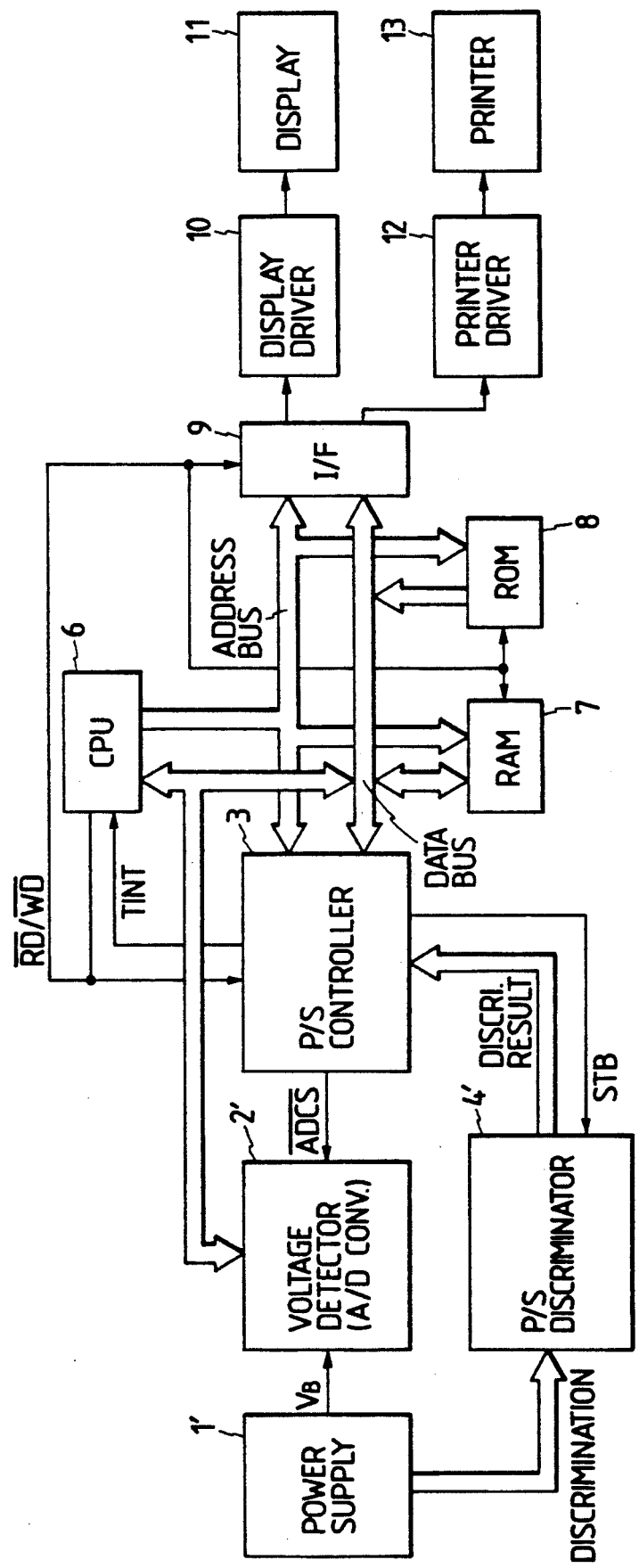
FIG. 12 is a block diagram showing an arrangement of the second embodiment according to the invention.
Figure 13:
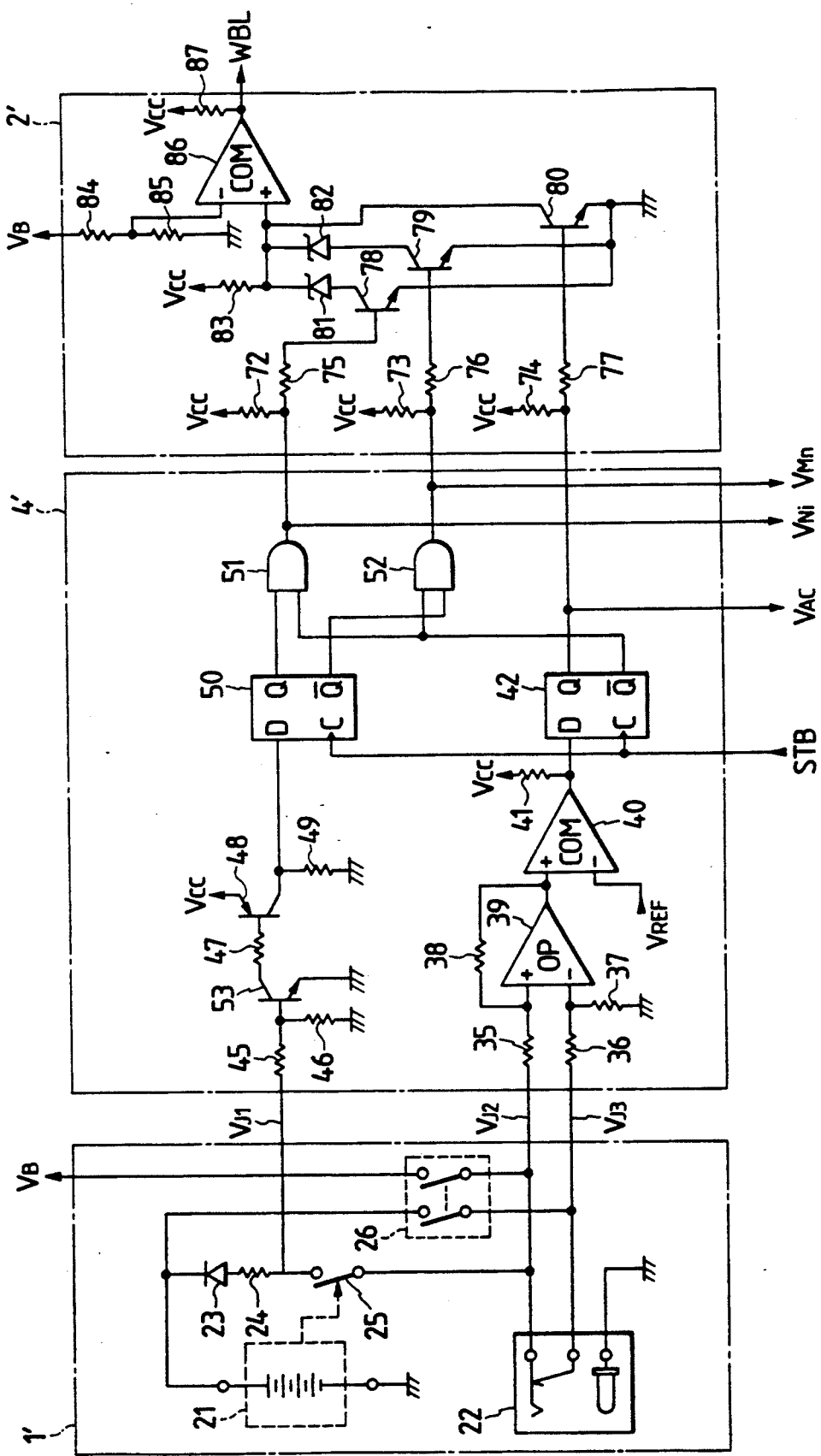
FIG. 13 is a circuit diagram showing constructions of a power supply circuit, a voltage detector, and a power source discriminator in the second embodiment.

FIG. 12 is a block diagram showing a construction of the second embodiment according to the invention. FIG. 13 is a circuit diagram showing constructions of a power supply circuit 1', a voltage detector 2', and a power source (P/S) discriminator 4' in the second embodiment. As shown in FIG. 12, the whole construction of the second embodiment is substantially the same as that of the first embodiment except the circuit constructions of the power supply circuit 1', voltage detector 2', and P/S discriminator 4'.

The power supply circuit 1' and P/S discriminator 4' will be first described.

In the second embodiment, the relations among $V_{J1}$, $V_{J2}$, and $V_{J3}$ as shown in Table described in the first embodiment are satisfied in accordance with the state of power source used in a manner similar to the first embodiment. For a circuit to discriminate the relation between $V_{J2}$ and $V_{J3}$, a state signal indicating whether the AC adapter has been connected or not is held in the D-type latch circuit 42 in a manner similar to the first embodiment. On the other hand, transistors 53 and 48 are turned on/off by the signal $V_{J1}$. A state signal indicating which one of the NiCd battery 110 and the Mn battery 120 is used is held in a D-type latch circuit 50. In the foregoing Table, in the states Nos. 1 to 3 of the power source used, as in the first embodiment, the output signal $V_{AC}$ at the Q terminal of the D-type latch circuit 42 is set to the "H" level and, at this time, since the output signal at the $\overline{Q}$ terminal of the latch circuit 42 is set to the "L" level, output signals $V_{Ni}$ and $V_{Mn}$ of AND circuits 51 and 52 are set to the "L" level ($V_{Ni}$=$V_{Mn}$="L") irrespective of the state of $V_{J1}$. In the state No. 4, since the signal $V_{J1}$ is set to the "H" level, the transistor 53 is turned on. Thus, the transistor 48 is also turned on and a current flows through a resistor 49 from the voltage $V_{cc}$. An "H" level signal is input to a D input terminal of the D-type latch circuit 50. At this time, since there is a relation of $V_{J2}$=$V_{J3}$, the $\overline{Q}$ output signal of the latch circuit 42 is set to the "H" level because of the reason similar to that in the first embodiment, so that the discrimination result signals are set such that $V_{Ni}$="H" and $V_{Mn}$="L".

On the other hand, in the state No. 5, since the switch 25 is off, the discrimination signal $V_{J1}$ is set to the "L" level by a resistor 46. Therefore, the transistors 53 and 48 are turned off and the "L" level signal is input to the D input terminal of the D-type latch circuit 50. On the other hand, since $V_{J2}$=$V_{J3}$, the discrimination result signals are set such that $V_{Ni}$="L" and $V_{Mn}$="H". Thus, discrimination result signal of the P/S discriminator 4' is set as shown in the above Table in a manner similar to the first embodiment. In the above Table, the values of "H" and "L" of $V_{J1}$ are the values enough to turn on/off the transistor 53. Reference numerals 45 and 47 denote resistors to limit base currents of the transistors 53 and 48, respectively.

The voltage detector 2' shown in FIG. 13 will now be described. Reference numerals 72, 73, and 74 denote pull-up resistors of $V_{cc}$ to turn on transistors 78, 79, and 80, respectively; 75, 76, and 77 resistors to limit base currents of the transistors 78, 79, and 80, respectively; 78 and 80 indicate the transistors which are turned on/off in accordance with the state of a discrimination result signal of the P/S discriminator 4'; 84 and 85 resistors to divide the power source voltage $V_B$; and 86 a comparator for comparing the voltage obtained by dividing the power source voltage $V_B$ by the resistors 84 and 85 with (a reference input voltage+a terminal voltage) and for outputting the result of the comparison as a WBL signal.

Reference numeral 87 denotes a resistor to specify the output voltage level from the comparator 86; 81 and 82 indicate Zener diodes to decide a reference voltage of the comparator 86; and 83 a resistor to limit currents flowing through the Zener diodes 81 and 82.

The operation of the voltage detector 2' will now be described in accordance with the states of power source used shown in the above Table.

In the states Nos. 1 to 3, the discrimination result signals are set such that $V_{AC}$="H" and $V_{Ni}$=$V_{Mn}$="L" and this means that the AC adapter is useful (connected). At this time, the transistors 78 and 79 are turned off and only the transistor 80 is turned on. Therefore, since the (+) input terminal of the comparator 86 is set to the GND level, even if the power source voltage $V_B$ fluctuates, the state of WBL ="L" is held.

In the state of No. 4, since $V_{AC}$="L", $V_{Ni}$="H", and $V_{Mn}$="L", only the transistor 78 among the transistors 78, 79, and 80 is turned on. On the other hand, the voltage at the (+) input terminal of the comparator 86 is determined by the value of the Zener diode 81. Although WBL="L" when the divided voltage value of the voltage $V_B$ is higher than the voltage of the Zener diode 81, when the battery capacity gradually decreases and the divided voltage value is smaller than the value of the Zener diode 81, WBL="H".

On the other hand, in the state No. 5, since the discrimination result signals are such that $V_{AC}$="L", $V_{Ni}$="L", and $V_{Mn}$="H", only the transistor 79 is turned on and the Zener diode 82 is made effective, so that the power source voltage $V_B$ is managed by the value of the Zener diode 82. The value of the Zener diode should be selected together with the values of the resistors 84 and 85 so that the WBL signal changes at the points WB of the NiCd battery 110 and Mn battery 120. Generally, the value of Zener diode 81 is set to be higher than the Zener diode 82.

In the second embodiment, since the P/S controller 3 and the power supply processing operation are similar to those in the first embodiment, their descriptions are omitted.

As mentioned above, even in the second embodiment, the effect similar to that in the first embodiment can be obtained.

Third Embodiment

The third embodiment will now be described.

It is a feature of the third embodiment that a residual amount of the battery capacity is displayed step by step in accordance with the kind of battery. An example of a circuit in the third embodiment will now be described hereinbelow. On the other hand, since a whole construction has the same overlap portions as those in the first and second embodiments, the description of the overlap portions is omitted here.

In the third embodiment, since the circuit construction is the same as those in the first and second embodiments except the voltage detector 2 and P/S controller 3 shown in FIG. 2 and the display 11 shown in FIG. 9, the description of the same circuit construction is omitted here.

FIG. 14 is a circuit diagram showing constructions of a power supply circuit 1″, a voltage detector 2″, and a power source (P/S) discriminator 4″ in the third embodiment. The P/S discriminator 4′ shown in FIG. 13 in the second embodiment can be also used as a P/S discriminator 4″ shown in FIG. 14. On the other hand, in FIG. 14, an A/D converter is used in the voltage detector 2″ and a change in power source voltage $V_B$ can be read step by step. Reference numeral 92 denotes an analog/digital (A/D) converter of the type for sequentially converting an analog signal into a digital signal; 88 and 89 resistors to divide the power source voltage $V_B$; 91 a Zener diode to decide a reference voltage of the A/D converter 92; and 90 a resistor to limit a current flowing through the Zener diode 91. The A/D converter 92 has the function for comparing a reference voltage value $V_{ref}$ which is determined by the Zener diode 91 and the divided voltage value obtained by dividing the power source voltage $V_B$ by the resistors 88 and 89 and for outputting the result of the comparison to a data bus. The CPU 6 sets (writes) necessary parameters to the A/D converter 92 and reads the result of the A/D conversion through a data bus.

The P/S controller 3″ will now be described.

Figure 15:
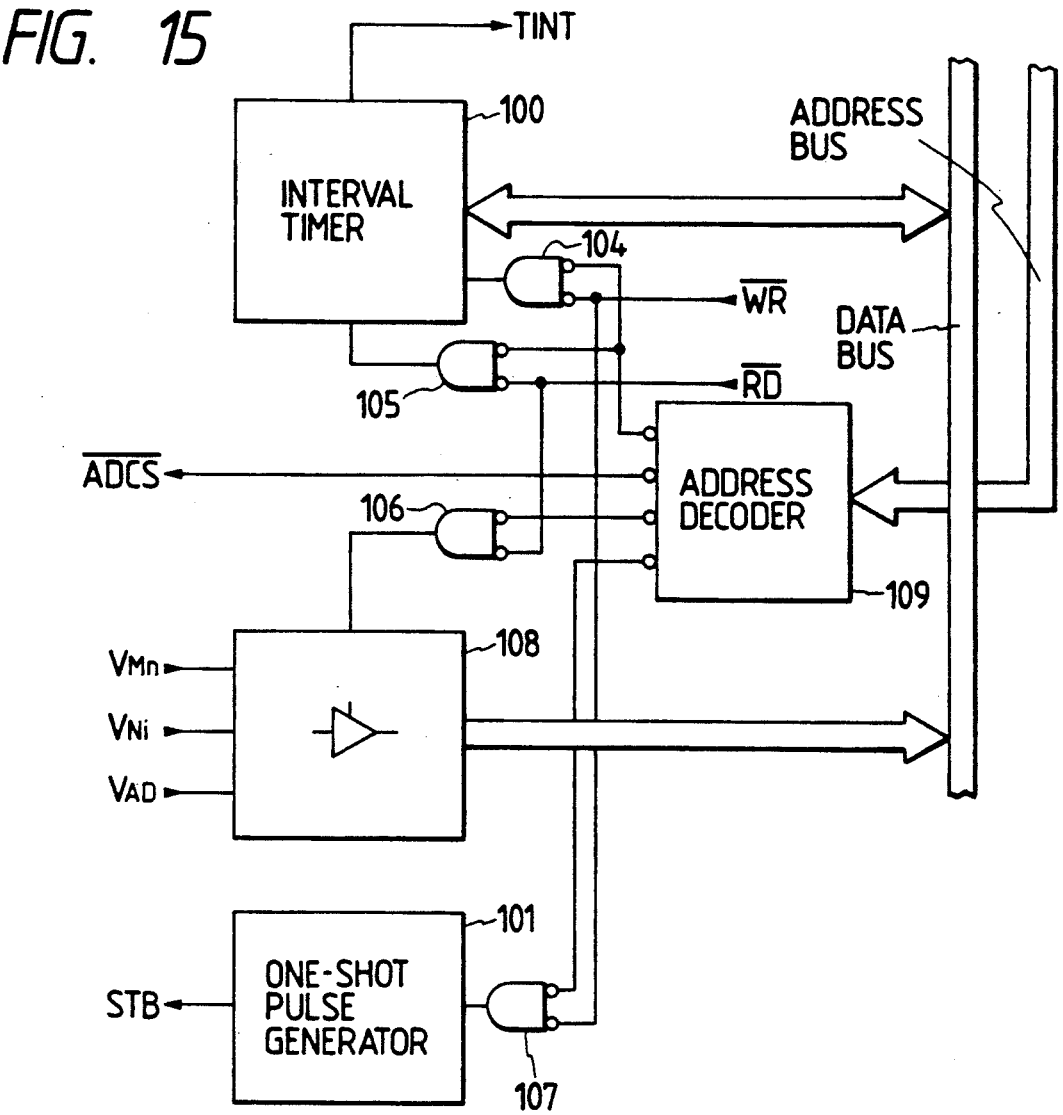
FIG. 15 is a circuit diagram schematically showing a construction of a power source controller.

FIG. 15 is a circuit diagram schematically showing a construction of the P/S controller 3″. As shown in FIG. 15, since a circuit construction of the P/S controller 3″ is almost similar to that of the P/S controller 3 shown in FIG. 3, the portions having the same functions as those in the P/S controller 3 in FIG. 3 are designated by the same reference numerals and their descriptions are omitted since the similar portions have already been described in the first and second embodiments. In FIG. 15, reference numeral 108 denotes a tristate input buffer having the function to inform the states of the discrimination result signals $V_{Mn}$, $V_{Ni}$, and $V_{AC}$ to the CPU 6 through the data bus. Reference numeral 109 indicates an address decoder to form selection signals of the interval timer 100, tristate input buffer 108, one-shot pulse generator 102, and A/D converter 92 by address signals from the address bus.

In the third embodiment, the following circuit construction is provided and the voltage drop state of the battery is detected step by step.

Figure 16:
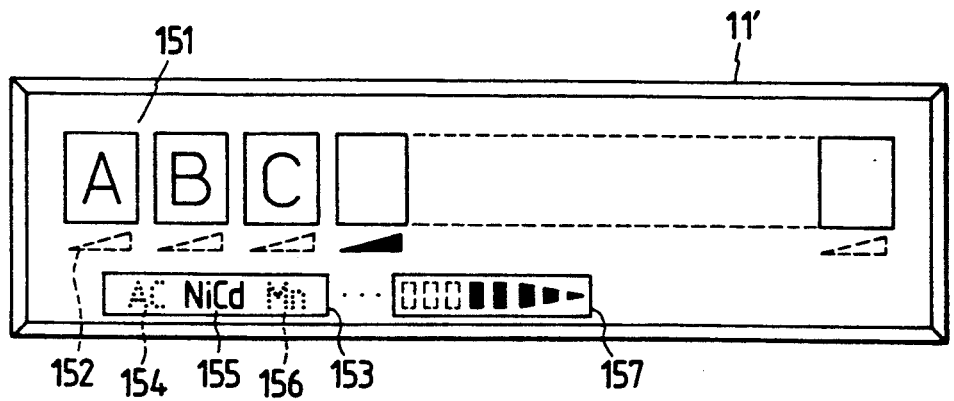
FIG. 16 is a front view for explaining a display screen of a display in the third embodiment.
Figure 17A:
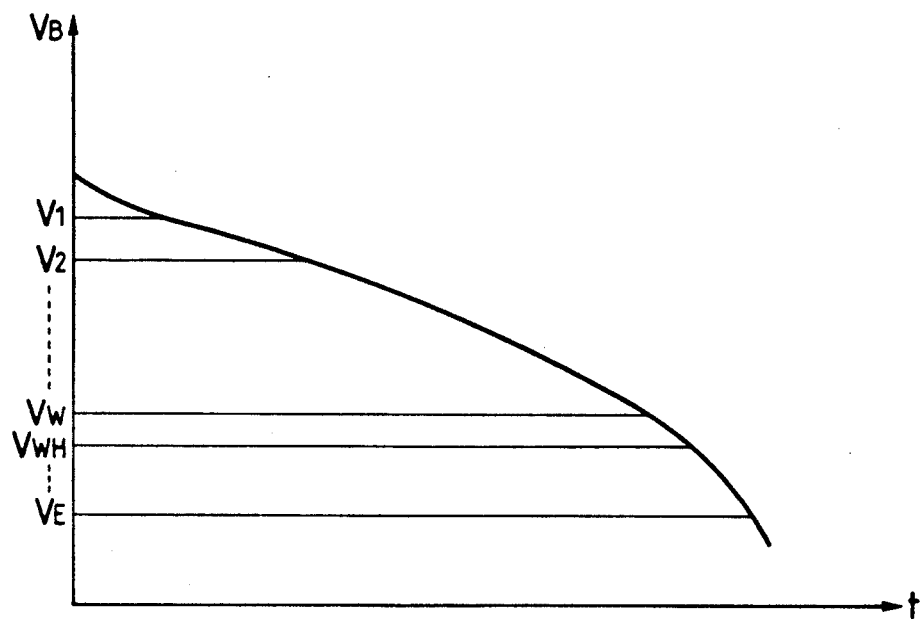
FIG. 17A is a graph showing voltage values in the case where the voltage effect of a manganese battery was read step by step.
Figure 17B:
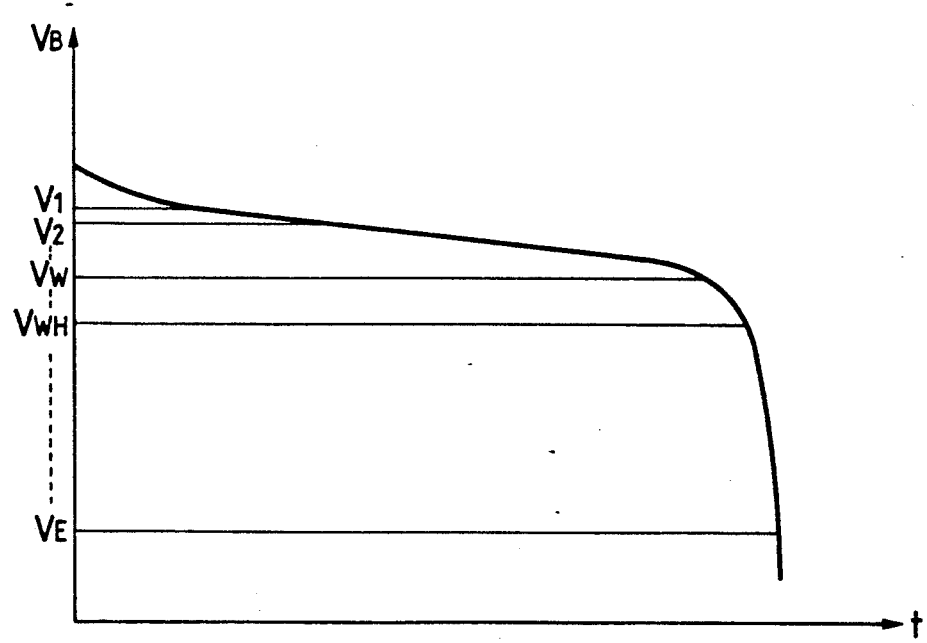
FIG. 17B is a graph showing voltages values in the case where the voltage effect of the nickel-cadmium battery was read step by step.

FIG. 17A is a graph showing voltage values in the case where the voltage drop of the manganese battery 120 was read step by step. FIG. 17B is a graph showing voltage values in the case where the voltage drop of the nickel-cadmium battery 110 was read step by step. As shown in both graphs, the voltage drop states of the Mn battery 120 and NiCd battery 110 are detected at a few stages by the voltage values in a manner such as $V_1$, $V_2$, ..., $V_W$, $V_{W+1}$, ..., $V_E$. A residual amount of each of the battery capacities is displayed step by step by a display 11′ in FIG. 16.

As shown in FIGS. 17A and 17B, the voltages of the Mn battery 120 and NiCd battery 110 are first checked the same number of times. The detected voltage values are displayed as residual amounts by the display 11′.

The display 11′ will now be described herein-below.

FIG. 16 is a front view for explaining the display screen of the display 11′ in the third embodiment. Reference numeral 157 indicates a battery capacity display frame to display the present battery capacity. In the battery capacity display frame 157, the state of the battery capacity is expressed by lighting off the indicator lamps as display elements one by one. Reference numeral 153 indicates an effective power display frame to display the kind of effective power source. Reference numerals 154, 155, and 156 show positions to display the kind of battery when AC (AC adapter), NiCd (nickel-cadmium), or Mn (manganese battery) was selected by lighting up the indicator lamp at the corresponding position. In FIG. 16, the display at the position 155 indicates that "NiCd" was selected. Reference numeral 151 denotes a character display frame and 152 represents a cursor display position to display a cursor.

The operation of the third embodiment will now be described.

Figure 18A:
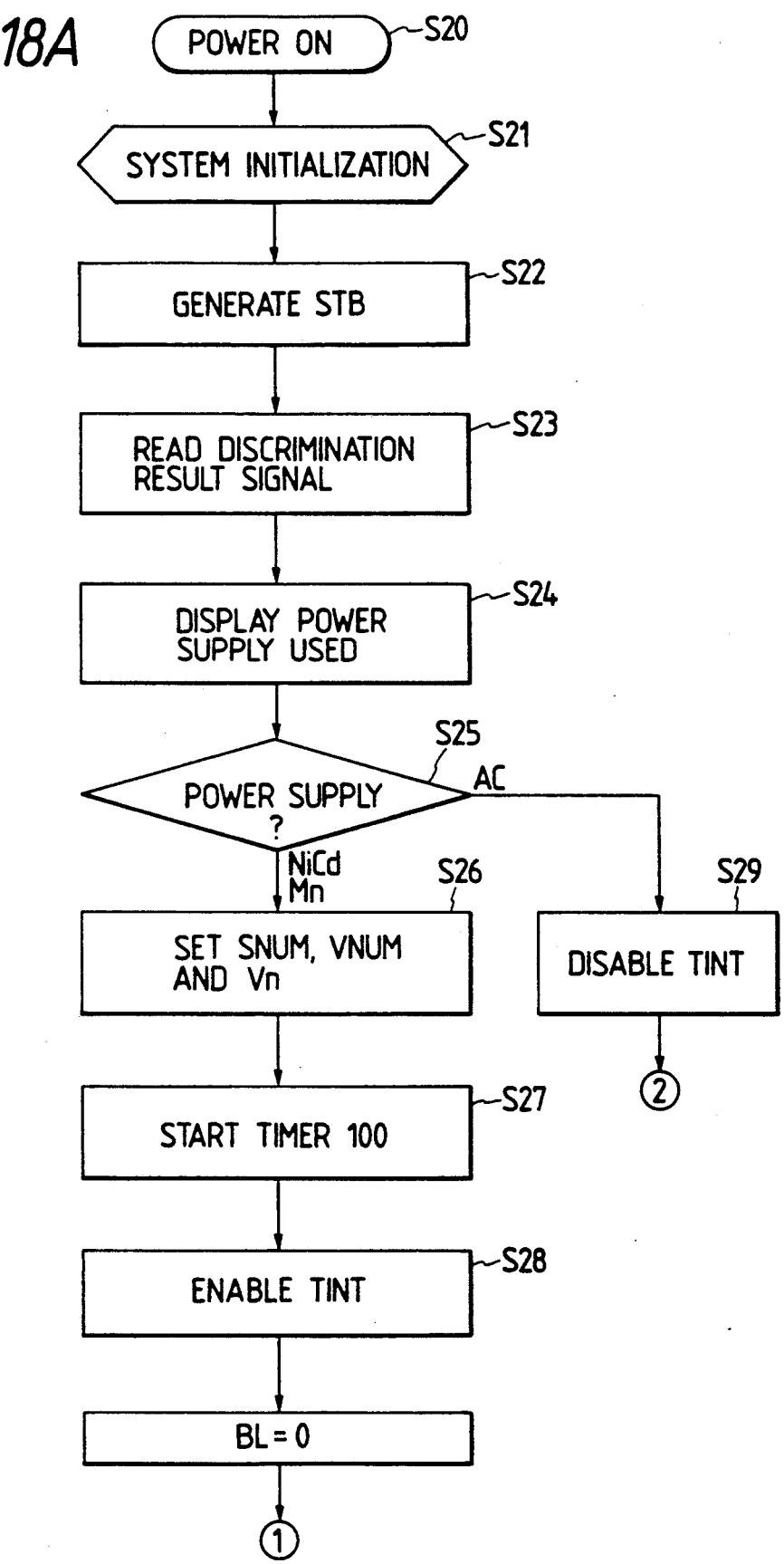
FIGS. 18A and 18B are flowcharts for explaining the operation of the power supplying process in the third embodiment.
Figure 18B:
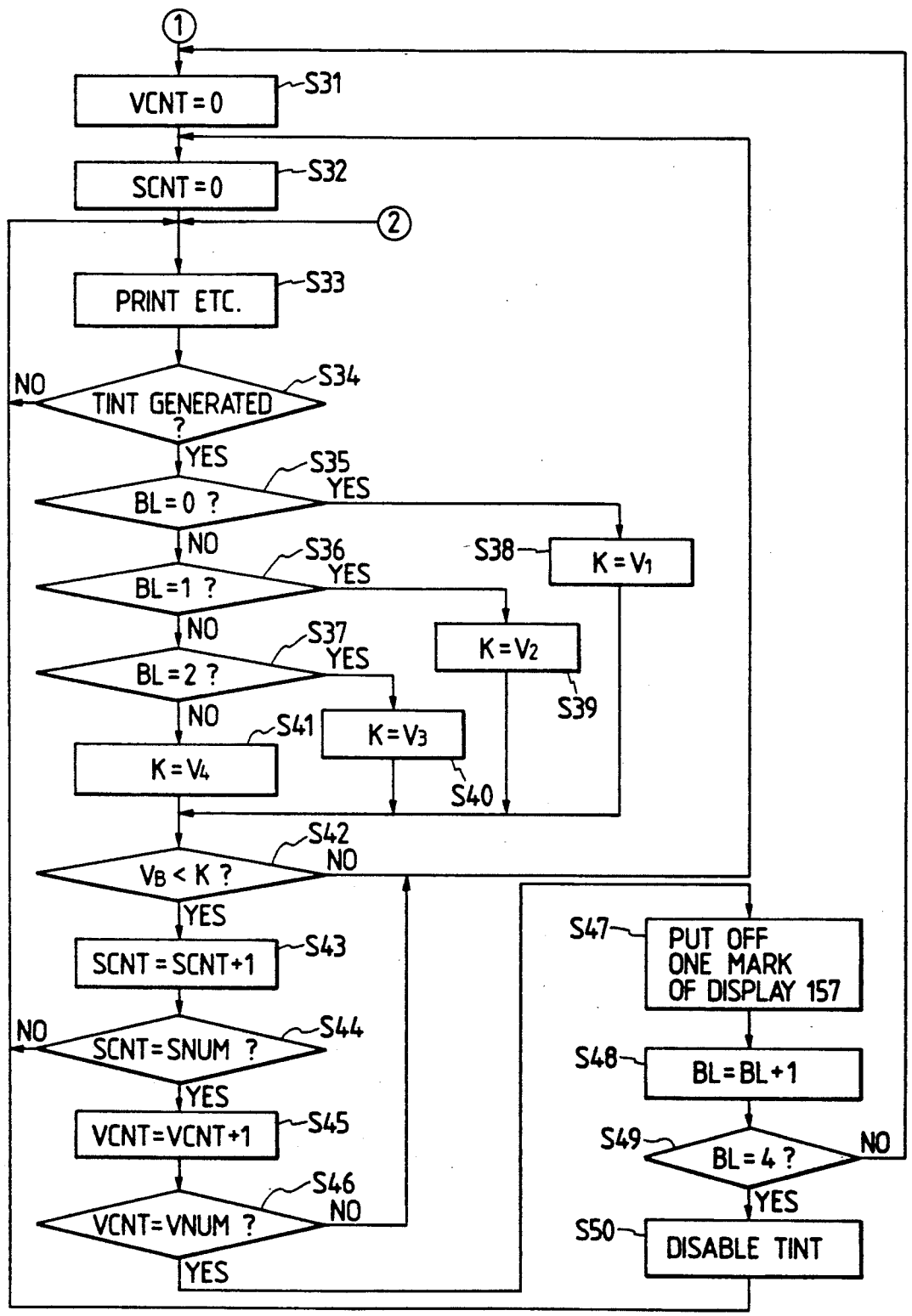

FIGS. 18A and 18B are flowcharts for explaining the power supply processing operation in the third embodiment. The program for the above flowcharts is stored in an ROM (not shown) in the third embodiment. Although the detection level of the power source voltage has been set to four stages for simplification of the explanation in the flowcharts, in the case of actually increasing the number of stages, it can be easily realized by merely increasing the value of BL and the value of n in the detection voltage $V_n$ which are used in the following description and increasing the number of discrimination terms by the BL value.

The power source is supplied to the system by turning on the switch 26 and the CPU 6 starts the operation and starts the execution of the program (step S20). Since the operations in the next steps S21 to S24 have already been described in the first embodiment, their descriptions are omitted here because the same processes as those in the operations in steps S2 to S5 in FIG. 11 are executed.

In the next step S25, the CPU 6 discriminates the power source used by the discrimination result signals $V_{AC}$, $V_{Ni}$, and $V_{Mn}$. The following processes are executed separately with respect to the case where the AC adapter is connected and where the NiCd battery or Mn battery is inserted. When the AC adapter is connected, the processing routine first advances to step S29 and the interval (TINT signal) of the interval timer 100 is set to be disable. Then, step S33 follows and various operations such as printing and the like are executed. In this case, since no timer interruption occurs in step S34, the various processing operations in step S33 are repeated.

On the other hand, if it is determined in step S25 that the NiCd battery 110 or Mn battery 120 is used, the processing routine advances to step S26 and various processes to detect the battery voltage are started. First, to execute the detecting method similar to the first embodiment, the number (hereinafter, referred to as "SNUM") of continuous detection times, the number (hereinafter, referred to as "VNUM") of detection times of the level of the voltage value $V_n$ at a certain stage, and the stepwise voltage value $V_n$ (four stages $V_1$ to $V_4$ are set in the example) which are parameters to discriminate the stepwise voltage values are selected and read out of the table in the ROM 8 (not shown) in accordance with the kind of power source and are set into special addresses in the RAM 7 (not shown) (step S26). The interruption interval times to read the voltages ($V_1$ to $V_4$) are selected and read out of the table in the ROM 8 on the basis of the kind of power source used and are set into the interval timer 100. At this time point, the interval timer 100 starts the operation (step S27). The interruption (TINT signal) of the interval timer 100 is permitted (enabled) and the interruption is performed to the CPU 6 for every predetermined time (step S28).

In steps S30 to S32, the count values of the counters for the next processes are set. That is, a battery level counter (hereinafter, referred to as "BL"), a counter to count the number of detection times of the $V_n$ level (hereinafter, referred to as "VCNT"), and a counter to count the number of continuous detection times (hereinafter, referred to as "SCNT") are cleared to "0", respectively. Subsequently, various operations (printing and the like) of the system are started. In the next step S34, the operations are continuously performed until the timer interruption (TINT signal) from the interval timer 100 occurs. In step S34, when the CPU 6 accepts the occurrence of the timer interruption (TINT signal), the processing routine advances to step S35 and subsequent steps to execute each of the voltage detecting operations.

In steps S35 to S37, the value of BL is checked and the value of a comparison voltage (K) to examine the level of the power source voltage value is set to either one of the stepwise voltage values $V_1$ to $V_4$ in accordance with the value of BL. First, after the power supply was turned on, since BL=0 in step S30, K=$V_1$ is set in step S38. In the next step S42, the CPU 6 reads the value of the power source voltage $V_B$ (actually, the conversion data obtained by comparing the value which was obtained by dividing the $V_B$ by the resistors 88 and 89 with the reference value $V_{ref}$) from the A/D converter 92 and compares with the value of K. Thus, if the value of the voltage $V_B$ is equal to or larger than the value of K, the processing routine is returned to step S32. After the SCNT was cleared to "0" in a manner similar to the above description, the system waits for the next interruption. In step S42, if the relation of $V_B<K$ is satisfied, on the contrary, the processing routine advances to step S43 and the SCNT is increased by "1". Subsequently, in step S44, a check is made to see if the SCNT value has reached the SNUM value set in the RAM 7 in step S26 or not. Thus, if SCNT<SNUM, the processing routine is returned to step S33 and various operations are executed as mentioned above until the next timer interruption occurs. On the other hand, if SCNT=SNUM in step S44, this means that the state of $V_B<K$ has continued for a predetermined time or longer. Since it is determined that the power source voltage has approached the voltage level of the point of the voltage $V_n$, the VCNT is increased by "1" in step S45. The VCNT value obtained in step S45 is compared with the VNUM value set in the RAM 7 in step S26 (step S46). Thus, if VCNT<VNUM, it is decided that the voltage $V_B$ does not yet reach the point of the voltage $V_n$, so that the processing routine is returned to step S32. If it is determined that VCNT=VNUM in step S46, it is decided that the voltage $V_b$ has formally passed the point of the voltage $V_n$ and one of the indicator lamps to indicate the residual amount of the battery capacity in the battery residual amount display frame 157 of the display 11 is lit off (step S47). The value of BL of the battery level counter is increased by "1" (step S48). Due to this, the fact that the battery level changed by one level can be informed to the user through the eyes. Then, a check is made to see if the BL value has processed to the final stage or not (step S49). In the example, since the BL value has been set to four stages, by checking whether BL=4 or not, it is possible to discriminate whether the BL value has reached the final stage or not. If the result of the discrimination in such that BL<4, the processing routine is returned to step S31 and the VCNT and SCNT are respectively cleared to "0" in a manner similar to the above explanation and, thereafter, the system waits for the next timer interruption.

When the timer interruption (TINT signal) occurs in step S34, the BL value is increased by "1" in step S48, so that it is determined that BL=1 in step S36. In this case, since the processing routine advances to step S39, the K value is set to $V_2$. Although the explanation is omitted, the K value is sequentially set to $V_1$ to $V_4$ as mentioned above and a check is made to see if the voltage $V_B$ has reached the respective voltage value or not. At the same time, the indicator lamps in the battery residual amount display frame 157 of the display 11 are lit off one by one. If it is determined that BL=4 in step S49, the processing routine advances to step S50 and the interruption (TINT signal) of the interval timer 100 is disabled and the processing routine is returned to step S33 and various operations are executed. In this state, the residual amount is not displayed.

As described above, according to the third embodiment, there are obtained effects such that not only the effect similar to that in the first embodiment is obtained but also the voltage drop state can be accurately known by eye step by step in accordance with the kind of battery.

In the flowchart of the third embodiment, although the values of SNUM and VNUM have been set in step S26, they can be also changed in accordance with the BL value in step S35 and subsequent steps. In this case, a correct voltage change can be detected in accordance with the kind of battery.

As described above, according to the invention, for instance, since the consumption state of the battery which is used as a power source can be accurately known in accordance with the kind of battery, various batteries can be made the most of, respectively.

On the other hand, since the kind of power source, namely, the kind of battery which is used in the electronic system can be checked by eye from the outside, the trouble, when the battery capacity has been consumed, of removing the battery cover to check the kind of battery is eliminated. The power source can be easily recovered. For instance, in the case of the nickel-cadmium battery, it can be immediately charged by the AC adapter. On the other hand, in the case of the manganese battery, it can be exchanged to a new spare battery.

I claim:

1. An electronic system comprising:
   discriminating means for discriminating a kind of battery;
   setting means for setting a detection voltage on the basis of the kind of battery discriminated by said discriminating means; and
   displaying means for displaying a predetermined message indicating electrical power consumption of the battery on the basis of an output of one of said discriminating means and said setting means,
   wherein said display means further comprises means for displaying the kind of battery discriminated by said discriminating means.

2. An electronic system comprising:
   discriminating means for discriminating a kind of battery;
   setting means for setting a detection voltage on the basis of the kind of battery discriminated by said discriminating means; and
   display means for displaying a predetermined message indicating electrical power consumption of the battery on the basis of an output of one of said discriminating means and said setting means,
   wherein said display means further comprises means for displaying a battery exchange message in response to the detection voltage of said setting means.

3. An electronic system comprising:
   discriminating means for discriminating a kind of battery;
   setting means for setting a detection voltage on the basis of the kind of battery discriminated by said discriminating means; and
   display means for displaying a predetermined message indicating electrical power consumption of the battery on the basis of an output of one of said discriminating means and said setting means,
   wherein said display means further comprises means for displaying remaining capacity of the battery in response to the detection voltage of said setting means.

4. An electronic system comprising:
   discriminating means for discriminating a kind of battery;
   setting means for setting a voltage detection time interval on the basis of the kind of battery discriminated by the discriminating means; and
   display means for displaying a predetermined message indicating electric power consumption of the battery on the basis of the time interval set by the setting means.

5. A system according to claim 4, wherein the display means further comprises means for displaying a residual amount of battery discriminated by said discriminating means.

6. A system according to claim 4, wherein the display means further comprises means for displaying a residual amount of battery capacity at every voltage detection time interval set by said setting means.

7. An electronic system comprising:
   discriminating means for discriminating that a special kind of battery is being used;
   setting means for setting at least one of a detection voltage and a voltage detection time interval on the basis of the special kind of battery discriminated by the discriminating means;
   memory means including a memory table in which the at least one of the detection voltage and the voltage detection time interval corresponding to the special kind of battery discriminated by the discriminating means is stored; and
   means for changing the at least one of the detection voltage and the voltage detection time interval by an outside instruction.

8. A system according to claim 7, further comprising means for reading out and displaying the special kind of battery and information of battery capacity from the memory table on the basis of outputs of the discriminating means and the setting means.

9. An electronic system comprising:
   first discriminating means for discriminating that a battery of a special kind is being used;
   setting means for setting a voltage detection time interval on the basis of the special kind of battery discriminated by the first discriminating means;
   second discriminating means for discriminating whether a voltage detected every voltage detection time interval set by said setting means is at an abnormal voltage level;
   measuring means for measuring the number of times the second discriminating means determines that the voltage detected at every voltage detection time interval set by said setting means is at the abnormal voltage level; and
   third discriminating means for discriminating a state of use of the battery on the basis of the number of times measured by the measuring means.

10. A system according to claim 9, further comprising means including a memory table for storing the voltage detection time interval corresponding to the discrimination that the special kind of battery is being used by the first discriminating means and means for changing the voltage detection time interval by an outside instruction.

11. An electronic system comprising:
    discriminating means for discriminating a kind of battery;
    setting means for setting a detection voltage on the basis of the kind of battery discriminated by said discriminating means; and
    display means for executing a predetermined display on the basis of an output of one of said discriminating means and said setting means,
    wherein said display means displays the kind of battery discriminated by said discriminating means.

12. An electronic system comprising:
    discriminating means for discriminating a kind of battery;
    setting means for setting a detection voltage on the basis of the kind of battery discriminated by said discriminating means; and
    display means for executing a predetermined display on the basis of an output of one of said discriminating means and said setting means,
    wherein said display means displays a residual amount of capacity of the discriminated kind of battery in response to the detection voltage of said setting means.

13. An electronic system comprising:
    discriminating means for discriminating a kind of battery;
    setting means for setting an interval of a voltage detection time on the basis of the kind of battery which was discriminated by the discriminating means; and display means for executing a predetermined display on the basis of the time interval set by the setting means, wherein the display means displays the kind of a battery discriminated by the discriminating means.

14. An electronic system comprising:

discriminating means for discriminating a kind of battery;

setting means for setting an interval of a voltage detection time on the basis of the kind of battery discriminated by the discriminating means; and display means for executing a predetermined display on the basis of the time interval set by the setting means, wherein the display means displays a residual amount of battery capacity at each voltage detection time interval set by the setting means.

15. An electronic system comprising:

discriminating means for discriminating that a special kind of battery is being used;

setting means for setting at least one of a detection voltage and a voltage detection time interval on the basis of the special kind of battery discriminated by the discriminating means;

memory means including a memory table for storing the at least one of the detection voltage and the voltage detection time interval corresponding to the special kind of battery discriminated by the discriminating means;

means for changing the at least one of the detection voltage and the voltage detection time interval by an outside instruction, and means for reading out and displaying the special kind of battery and information of battery capacity from the memory table stored in the memory means on the basis of outputs of the discriminating means and the setting means.

16. An electronic system comprising:

first discriminating means for discriminating that a special kind of battery is being used;

setting means for setting a voltage detection time interval on the basis of the special kind of battery discriminated by the first discriminating means;

second discriminating means for discriminating whether a voltage detected at every voltage detection time interval set by the setting means is at an abnormal voltage level;

measuring means for measuring the number of times the second discriminating means indicates the voltage detected at every voltage detection time interval set by the setting means is at the abnormal voltage level;

third discriminating means for discriminating a state of use of the battery on the basis of the number of times measured by the measuring means; and means including a memory table for storing the voltage detection time interval corresponding to the special kind of the battery discriminated by the first discriminating means and means for changing the voltage detection time interval by an outside instruction.

* * * * *

UNITED STATES PATENT AND TRADEMARK OFFICE
CERTIFICATE OF CORRECTION

PATENT NO. : 5,162,721

DATED : November 10, 1992

INVENTOR(S) : SHOJI SATO

Page 1 of 2

It is certified that error appears in the above-identified patent and that said Letters Patent is hereby corrected as shown below:

COLUMN 1

Line 38, "differ, widely" should read --differ widely,--.

COLUMN 4

Line 4, "effect" should read --drop--.
Line 6, "voltages" should read --voltage--.
Line 7, "effect" should read --drop--.
Line 36, "circuit, 1." should read --circuit 1.--.
Line 45, "to" should be deleted.

COLUMN 5

Line 8, "view" should read --views--.

COLUMN 6

Line 31, "transistor transistor" should read --transistor-transistor--.

COLUMN 10

Line 47, "appears" should read --appears.--.

UNITED STATES PATENT AND TRADEMARK OFFICE
CERTIFICATE OF CORRECTION

PATENT NO. : 5,162,721

DATED : November 10, 1992

INVENTOR(S) : SHOJI SATO

It is certified that error appears in the above-identified patent and that said Letters Patent is hereby corrected as shown below:

COLUMN 19

Line 7, "displaying means" should read --display means--.
    Line 53, "a residual" should read --the kind--.
    Line 54, "amount" should be deleted.

Signed and Sealed this

Eleventh Day of January, 1994

Attest:

BRUCE LEHMAN

Attesting Officer    Commissioner of Patents and Trademarks